US007792084B2

(12) United States Patent
Yamamoto et al.

(10) Patent No.: US 7,792,084 B2
(45) Date of Patent: Sep. 7, 2010

(54) MIMO ANTENNA APPARATUS CONTROLLING NUMBER OF STREAMS AND MODULATION AND DEMODULATION METHOD

(75) Inventors: Atsushi Yamamoto, Kyoto (JP); Hiroshi Iwai, Osaka (JP); Akira Kato, Osaka (JP); Satoru Amari, Osaka (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 11/892,886

(22) Filed: Aug. 28, 2007

(65) Prior Publication Data
US 2008/0069038 A1 Mar. 20, 2008

(30) Foreign Application Priority Data
Aug. 29, 2006 (JP) ............................. 2006-231857

(51) Int. Cl.
H04W 4/00 (2009.01)
(52) U.S. Cl. ..................................................... 370/334
(58) Field of Classification Search ........................ None
See application file for complete search history.

(56) References Cited
U.S. PATENT DOCUMENTS

| 6,760,882 B1 | 7/2004 | Gesbert et al. | |
| 7,058,367 B1 | 6/2006 | Luo et al. | |
| 7,230,928 B2 * | 6/2007 | Katz et al. | 370/332 |
| 7,574,236 B1 * | 8/2009 | Mansour | 455/69 |
| 7,593,486 B2 * | 9/2009 | Jeong et al. | 375/324 |
| 2002/0056066 A1 | 5/2002 | Gesbert et al. | |
| 2002/0147953 A1 | 10/2002 | Catreux et al. | |
| 2004/0174840 A1 | 9/2004 | Yano et al. | |
| 2005/0031044 A1 | 2/2005 | Gesbert et al. | |
| 2005/0099975 A1 | 5/2005 | Catreux et al. | |
| 2006/0104340 A1 | 5/2006 | Walton et al. | |
| 2006/0166626 A1 | 7/2006 | Luo et al. | |
| 2007/0058586 A1 * | 3/2007 | Ode et al. | 370/328 |
| 2008/0095263 A1 * | 4/2008 | Xu et al. | 370/307 |
| 2009/0092201 A1 | 4/2009 | Luo et al. | |

FOREIGN PATENT DOCUMENTS

| JP | 2004-266586 | 9/2004 |
| JP | 2005-65197 | 3/2005 |
| WO | 02/25853 | 3/2002 |

OTHER PUBLICATIONS

European Search Report issued Jun. 24, 2009 in corresponding European Application No. 07 11 5147.

* cited by examiner

Primary Examiner—Anh-Vu Ly
(74) Attorney, Agent, or Firm—Wenderoth, Lind & Ponack L.L.P.

(57) ABSTRACT

A MIMO antenna apparatus receives a plurality of radio signals modulated and transmitted by a sender-side radio station apparatus using a MIMO (Multi-Input Multi-Output) communication method with a number of data streams and a modulation and demodulation method. The MIMO antenna apparatus includes a plurality of antenna elements, detection means, MIMO demodulation means, radio transmission means, and control means. The control means controls the sender-side radio station apparatus by making the radio transmission means transmit the control signal, and controlling the MIMO demodulation means, so as to change, based on the received signal levels and the signal quality, at least one of the number of data streams and the modulation and demodulation method for the MIMO communication method used by the sender-side radio station apparatus and the MIMO demodulation means.

9 Claims, 14 Drawing Sheets

FIRST IMPLEMENTAL EXAMPLE OF FIRST PREFERRED EMBODIMENT

SECOND IMPLEMENTAL EXAMPLE OF FIRST PREFERRED EMBODIMENT

THIRD IMPLEMENTAL EXAMPLE OF FIRST PREFERRED EMBODIMENT

SECOND PREFERRED EMBODIMENT

MIMO ANTENNA APPARATUS CONTROLLING NUMBER OF STREAMS AND MODULATION AND DEMODULATION METHOD

BACKGROUND OF THE INVENTION

1. Field of the Invention

The present invention relates to an antenna apparatus for use in a radio communication apparatus which is controlled so as to achieve high-speed communication with increased communication capacity as well as keep high communication quality in mobile communication through a mobile telephone or the like. The present invention particularly relates to a MIMO antenna apparatus controlling the number of streams and the modulation and demodulation method, and a radio communication apparatus provided with the MIMO antenna apparatus.

2. Description of the Related Art

There has been known an antenna apparatus using MIMO (Multi-Input Multi-Output) technique for simultaneously transmitting and/or receiving radio signals on a plurality of channels using a plurality of antenna elements, and such antenna apparatus includes, for example, a MIMO antenna apparatus disclosed in the Japanese patent laid-open publication No. 2004-266586 (referred to as "a first prior art document" hereinafter).

A mobile communication system with the MIMO antenna apparatus of the first prior art document is configured in its sender side as follows: a transmission signal is channel-encoded into number M of signals by a channel encoder, these number M of signals are modulated into number M of complex modulated signals (modulated symbols) by number M of modulators respectively, these number M of complex modulated signals are then multiplied to a complex matrix consisting of number M*L of complex coefficients by a complex matrix operation unit such that number L of complex signals are generated, and these number L of generated complex signals are transmitted through number L of transmitting antenna elements respectively. In this configuration, the complex matrix operation unit performs a matrix operation so as to weight the number M of modulated signals with different complex weight coefficients respectively, and this reads to achieving the beam forming on the radio signals transmitted from the number L of transmitting antenna elements respectively. Thus, the mobile communication system of the first prior art document is intended to attain transmission diversity effect, as well as the beam forming for suppressing interference waves. Furthermore, the invention of the first prior art document provides a data transmission method in which the modulation method and transmission rate are appropriately controlled even under a dynamically variable propagation channel environment, by virtue of the diversity effect. Moreover, the mobile communication system equipped with the MIMO antenna apparatus of the first prior art document is configured in its receiver side as follows: number N of received signals that have been received through number N of receiving antenna elements are multiplied to a complex matrix consisting of N*M complex coefficients by a MIMO demodulator such that number M of complex signals (received symbols) are generated, the number M of complex signals are demodulated into number M of demodulated signals by number M of demodulators respectively, and then, the number M of demodulated signals are channel-decoded into a received data by a channel decoder. In this configuration of the receiver side MIMO demodulator, the influences of noises and interferences can be minimized by employing the MMSE (Minimum Mean Square Error) algorithm for reducing interferences.

Thus, according to the first prior art document, the mobile communication system equipped with the MIMO antenna apparatus can be provided, such that at the sender side of the mobile communication system, a high-speed data communication through multiplexed channels can be achieved by multiplying the number M of modulated signals to the complex matrix consisting of the number M*L of elements so that the number L of complex signals are generated and transmitting the number L of complex signals through the number L of transmitting antenna elements respectively, and at the receiver side of the mobile communication system, the limit of interference can be extended by reducing the interferences in the MIMO demodulator.

Moreover, there has been known a prior art MIMO antenna apparatus having transversal filters, and such antenna apparatus includes, for example, a MIMO antenna apparatus disclosed in the Japanese patent laid-open publication No. 2005-065197 (referred to as "a second prior art document" hereinafter).

A MIMO-OFDM receiver equipped with the MIMO antenna apparatus of the second prior art document is configured to eliminate interference waves by transversal filters each provided for each one of a plurality of receiving antenna elements, and then to perform MIMO demodulation. In this way, the radio signals can be received by using MIMO, even in an environment including the interference waves. Therefore, according to the technique of the second prior art document, the MIMO-OFDM receiver can be provided, which can suppress the interferences, compensate for deterioration of accuracy in timing recovery and channel estimation, and achieve high-speed signal transmission in any case. Thus, according to the second prior art document, the MIMO-OFDM receiver equipped with the MIMO antenna apparatus is provided, which can receive radio signals by using MIMO and achieve the high-speed radio transmission even in the environment including interference waves, by eliminating the interference waves by means of the transversal filters each provided for each one of the receiving antenna elements and then performing the MIMO demodulation, However, the prior art MIMO antenna apparatus of the first prior art document has the following problems. The first prior art document discloses the MIMO antenna apparatus which can attain the transmit diversity effect as well as achieve the beam forming for suppressing the interference waves, by providing the sender side with the number M of modulators and the number L of transmitting antenna elements, in order to increase the data transmission rate as high as possible. However, since the MIMO antenna apparatus of the first prior art document has many transmitting antenna elements, it is quite difficult to mount a number of antenna elements on a small-sized apparatus with a size of one wavelength or less, such as a mobile telephone. Moreover, even if the MIMO antenna apparatus of the first prior art document is employed at a base station of the mobile telephone system, the cost increases and the control becomes more complicated in response to an increase in the number of antenna elements.

Meanwhile, the prior art MIMO antenna apparatus of the second prior art document using the plurality of transversal filters has the following problems. This prior art MIMO antenna apparatus can suppress the interference waves since the transversal filters are provided for the respective receiving antenna elements, however, the size of receiver circuit becomes disadvantageously larger. In other words, it is impossible to configure this prior art MIMO antenna apparatus into a small-sized form, and to use this prior art MIMO antenna apparatus in a battery-operated mobile radio apparatus.

SUMMARY OF THE INVENTION

The object of the present invention is therefore to overcome the aforementioned problems, and to provide a MIMO antenna apparatus which can achieve high quality and high-speed communication even in a small-sized MIMO antenna apparatus by performing both of the interference suppression and the MIMO demodulation process when a desired receiving quality has not been attained, as well as provide a mobile radio communication apparatus provided with the MIMO antenna apparatus In order to achieve the aforementioned objective, according to one aspect of the present invention, a MIMO antenna apparatus is provided that receives a plurality of radio signals modulated and transmitted by a sender-side radio station apparatus using a MIMO (Multi-Input Multi-Output) communication method with a number of data streams and a modulation and demodulation method. The MIMO antenna apparatus includes a plurality of antenna elements, detection means, MIMO demodulation means, radio transmission means, and control means. The plurality of antenna elements receive the plurality of radio signals, respectively. The detection means detects respective received signal levels of the plurality of radio signals. The MIMO demodulation means performs MIMO demodulation of the plurality of radio signals to generate a first demodulated signal, and determines a signal quality of the first demodulated signal. The radio transmission means wirelessly transmits a control signal to the sender-side radio station apparatus, and the control signal controls the MIMO communication method used by the sender-side radio station apparatus. The control means controls the sender-side radio station apparatus by making the radio transmission means transmit the control signal, and controlling the MIMO demodulation means, so as to change, based on the received signal levels and the signal quality, at least one of the number of data streams and the modulation and demodulation method for the MIMO communication method used by the sender-side radio station apparatus and the MIMO demodulation means. In the case that the signal quality of the first demodulated signal is lower than a first threshold value, (1) when the received signal levels of all of the plurality of radio signals are equal to or larger than a second threshold value, the control means decreases the number of data streams for the MIMO communication method used by the sender-side radio station apparatus and the MIMO demodulation means; and (2) when the received signal level of at least one of the plurality of radio signals is smaller than the second threshold value, the control means changes the modulation and demodulation method for the MIMO communication method used by the sender-side radio station apparatus and the MIMO demodulation means to a modulation and demodulation method with a transmission rate lower than a current transmission rate.

Moreover, in the MIMO antenna apparatus, in the case that the signal quality of the first demodulated signal is equal to or larger than the first threshold value, when the received signal levels of all of the plurality of radio signals are equal to or larger than the second threshold value, the control means changes the modulation and demodulation method for the MIMO communication method used by the sender-side radio station apparatus and the MIMO demodulation means to a modulation and demodulation method with a transmission rate higher than the current transmission rate.

Further, in the MIMO antenna apparatus, in the case that the control means has decreased the number of data streams for the MIMO communication method used by the sender-side radio station apparatus and the MIMO demodulation means to a certain number, when number of times of demodulation performed by the MIMO demodulation means exceeds a certain maximum number of times of demodulation, the control means increases the number of data streams for the MIMO communication method used by the sender-side radio station apparatus and the MIMO demodulation means.

Furthermore, the MIMO antenna apparatus further includes adaptive demodulation means and switch means. The adaptive demodulation means generates a second demodulated signal when the number of data streams is one, by weighting and demodulating the plurality of radio signals such that a main beam of the MIMO antenna apparatus is directed to a desired wave signal. The switch means is operable to input the plurality of radio signals into one of the MIMO demodulation means and the adaptive demodulation means. In the case that the control means have controlled the switch means to make the switch means input the plurality of radio signals into the MIMO demodulation means and the signal quality of the first demodulated signal is smaller than the first threshold value, (1) when the received signal levels of all of the plurality of radio signals are equal to or larger than the second threshold value, the control means decreases the number of data streams for the MIMO communication method used by the sender-side radio station apparatus and the MIMO demodulation means to one, and controls the switch means to make the switch means input the plurality of radio signals into the adaptive demodulation means; and (2) when the received signal level of at least one of the plurality of radio signals is smaller than the second threshold value, the control means changes the modulation and demodulation method for the MIMO communication method used by the sender-side radio station apparatus and the MIMO demodulation means to a modulation and demodulation method with a transmission rate lower than a current transmission rate.

Moreover, in the MIMO antenna apparatus, the adaptive demodulation means weight the plurality of radio signals by performing recurrent and repetitive processes such that the main beam of the MIMO antenna apparatus is directed to a desired wave signal.

Further, in the MIMO antenna apparatus, in the case that the control means have controlled the switch means to make the switch means input the plurality of radio signals into the MIMO demodulation means and the signal quality of the first demodulated signal is equal to or larger than the first threshold value, when the received signal levels of all of the plurality of radio signals are equal to or larger than the second threshold value, the control means changes the modulation and demodulation method for the MIMO communication method used by the sender-side radio station apparatus and the MIMO demodulation means to a modulation and demodulation method with a transmission rate higher than the current transmission rate.

Furthermore, in the MIMO antenna apparatus, in the case that the control means have controlled the switch means to make the switch means input the plurality of radio signals into the adaptive demodulation means, when number of times of demodulation performed by the adaptive demodulation means exceeds a maximum number of times of demodulation, the control means controls the switch means to make the switch means input the plurality of radio signals into the MIMO demodulation means, and increases the number of data streams for the MIMO communication method used by the sender-side radio station apparatus and the MIMO demodulation means.

Moreover, in the MIMO antenna apparatus, the radio transmission means transmits the control signal to the sender-side radio station apparatus using at least one of the plurality of antenna elements.

According to the another aspect of the present invention, a radio communication apparatus provided with the MIMO antenna apparatus is provided.

Since the present invention has the above-stated configurations, the present invention can decrease the number of data streams for the MIMO communication method, and/or change the modulation and demodulation method for the MIMO communication method, based on the signal quality of the demodulated signal and the respective signal levels of the received signals. Therefore, according to the present invention, the MIMO antenna apparatus can be provided which, even if it is small in size, can adaptively control the number of data streams and the modulation and demodulation method for the MIMO communication method in the case that the desired receiving quality is not achieved, and further, can perform the high quality and high-speed communication by carrying out both the interference wave suppression and the MIMO demodulation process. Additionally, according to the present invention, the mobile radio communication apparatus with such MIMO antenna apparatus can be provided.

The advantageous effects derived from typical aspects of the invention disclosed in the present application will be briefly described as follows. In a MIMO radio communication incorporating the adaptive modulation, if the signal quality of the demodulated signal is equal to or lower than a threshold value, the respective received signal levels are obtained for the antenna elements constituting the MIMO antenna apparatus. If these received signal level are equal to or larger than a predetermined receiving power, the sender-side radio station apparatus is instructed to decrease the number M of transmitted data streams by one. When the number of data streams is decreased to one, the adaptive demodulation means may be used to control the amplitudes and phases of the plurality of received signals. Accordingly, a main beam of the MIMO antenna apparatus can be directed to a desired wave signal and nulls of the MIMO antenna apparatus can be directed to interference wave signals. If the signal quality of the demodulated signal is lower than the threshold value, the sender-side radio station apparatus is instructed to use a modulation and demodulation method with a lower transmission rate for data transmission. Thus, high-speed and high signal quality communication can be achieved through utilizing both of the high-speed radio transmission by the MIMO communication and the interference wave suppression technique using the adaptive array antenna.

BRIEF DESCRIPTION OF THE DRAWINGS

These and other objects and features of the present invention will become clear from the following description taken in conjunction with the preferred embodiments thereof with reference to the accompanying drawings, throughout which like parts are designated by like reference numerals, and in which.

DETAILED DESCRIPTION OF THE PREFERRED EMBODIMENTS

Figure 1:
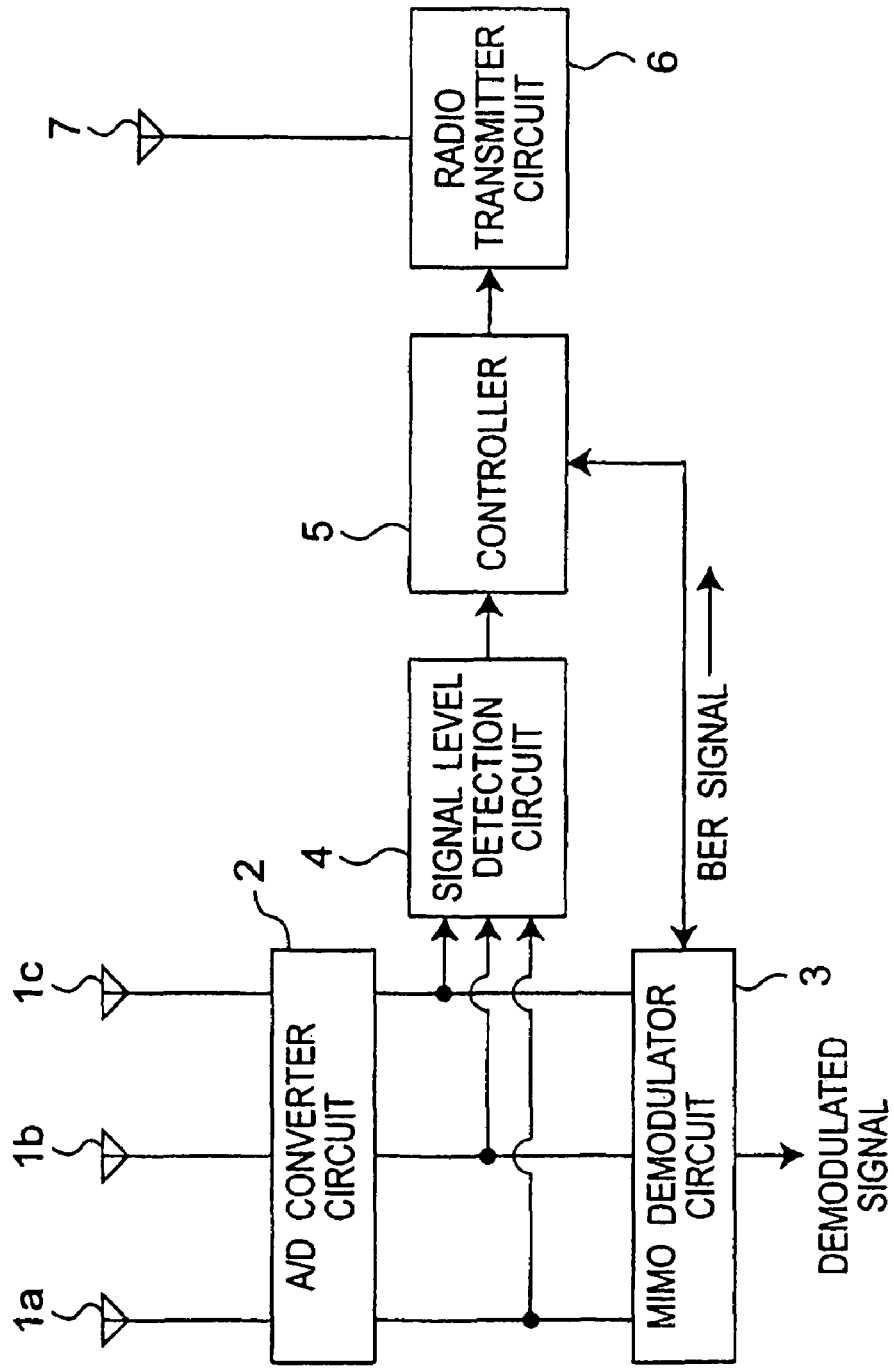
FIG. 1 is a block diagram showing a configuration of a MIMO antenna apparatus according to a first preferred embodiment of the present invention.

The preferred embodiments according to the present invention will be described below in a detailed manner with reference to the attached drawings. In the whole drawings in which the preferred embodiments of the present invention are explained, the parts having similar functions are denoted by the same reference numerals, respectively, and accordingly, they are not explained repeatedly.

First Preferred Embodiment

FIG. 1 is a block diagram showing a configuration of a MIMO antenna apparatus according to a first preferred embodiment of the present invention. Referring to FIG. 1, the MIMO antenna apparatus according to the present preferred embodiment will be described below. Referring to FIG. 1, three different radio signals transmitted from a sender-side radio station apparatus (not shown) using a certain MIMO communication method are received through three receiving antenna elements 1a, 1b, 1c, respectively, and the respective received radio signals are inputted into an analog/digital (A/D) converter circuit 2. The A/D converter circuit 2 includes three A/D converters each corresponding to each one of the input radio signals, performs an A/D conversion process on each one of the radio signals by these A/D converters individually, and outputs the processed signals (hereinafter, referred to as "received signals") to both of a MIMO demodulator circuit 3 and a signal level detection circuit 4. The MIMO demodulator circuit 3 performs a MIMO demodulation process on the three received signals to output one demodulated signal, as well as determines a bit error rate (BER) of the demodulated signal as a basis representing a signal quality of the demodulated signal, and outputs the determined result to a controller 5. As the signal quality, a packet error rate or a throughput (e.g., in the rate of the received data) can be used in place of the BER. The signal level detection circuit 4 detects respective signal levels of the three received signals and outputs the detected results to the controller 5. The signal level detection circuit 4 detects the signal levels in the form of, for example, carrier-to-noise power ratios (CNRs) or signal-to-interference plus noise power ratios (SINRs). Further, the MIMO demodulator circuit 3 informs to the controller 5 of the number of times by which demodulation processes on data of the received signals are performed (hereinafter, referred to as "the number of times of demodulation"), e.g., in units of a predetermined amount of data (such as the number of bits or the number of packets). The controller 5 performs a MIMO adaptive control process based on the information on the BER and the signal levels as described below with reference to FIGS. 7 and 8, and accordingly, changes a communication method used in the sender-side radio station apparatus and in the MIMO demodulator circuit 3.

In the present preferred embodiment, the communication method used in the sender-side radio station apparatus and in the MIMO demodulator circuit 3 is specified by the number of data streams for a communication and a modulation and demodulation method for the communication. More specifically, the MIMO antenna apparatus and the sender-side radio station apparatus can selectively execute one of MIMO communications each utilizing one, two or three data streams. If the number of data streams is one, such MIMO communication is also referred to as "SISO (Single-Input Single-Output) communication". Additionally, the MIMO antenna apparatus and the sender-side radio station apparatus can perform a MIMO communication (or a SISO communication) in which one of a plurality of modulation and demodulation methods with different transmission rates is selectively used. For example, the MIMO antenna apparatus and the sender-side radio station apparatus can communicate with each other by selectively using one of BPSK, QPSK, 16QAM and 64QAM (these are listed in ascending order for the transmission rate). The modulation and demodulation method to be used is not limited to one of those mentioned above, but can be changed according to an implemental example. When the controller 5 is to change the communication method used in the sender-side radio communication apparatus and in the MIMO demodulator circuit 3 (i.e., to change at least one of the number of data streams and the modulation and demodulation method), the controller 5 transmits a control signal through a radio transmitter circuit 6 and a transmitting antenna element 7 connected to the radio transmitter circuit 6, for requesting the sender-side radio communication apparatus to change a modulation process for the communication method used in the sender-side radio communication apparatus (i.e., the MIMO communication or the SISO communication), as well as changes a demodulation process for the communication method used in the MIMO demodulator circuit 3 (i.e., the MIMO communication or the SISO communication).

It is preferable that if necessary, the MIMO antenna apparatus according to the present preferred embodiment includes high-frequency filters each separating a signal at a predetermined frequency from each of the radio signals received through the receiving antenna elements 1a, 1b and 1c, and high-frequency amplifiers each amplifying the signals, in front of the A/D converter circuit 2. It is also preferable that if necessary, the MIMO antenna apparatus according to the present preferred embodiment includes high-frequency circuits such as mixers for the frequency conversion of the respective received signals outputted from the A/D converter circuit 2, intermediate-frequency circuits, and signal processing circuits etc., in front of the MIMO demodulator circuit 3. For simplicity, the above-mentioned constituent elements are not described or shown in the specification and the drawings of the present application.

As an example, the MIMO antenna apparatus having three receiving antenna elements will be described in this specification. Alternatively, the MIMO antenna apparatus may be configured to have two receiving antenna elements or four or more receiving antenna elements. Moreover, the MIMO antenna apparatus having one transmitting antenna element will be described in this specification as an example. Alternatively, the MIMO antenna apparatus may be configured to have a plurality of transmitting antenna elements.

As described so far, the MIMO antenna apparatus according to the present preferred embodiment is configured so that the controller 5 reduces the number of data streams for the MIMO communication method and/or changes the modulation and demodulation method for the MIMO communication method, based on the signal quality of the demodulated signal and the signal levels of the respective received signals. Therefore, according to the present preferred embodiment, the MIMO antenna apparatus can be provided which, even if it is small in size, can perform a high quality and high-speed communication by adaptively controlling the number of data streams and the modulation and demodulation method for the MIMO communication method in the case that the desired receiving quality is not achieved.

Figure 2:
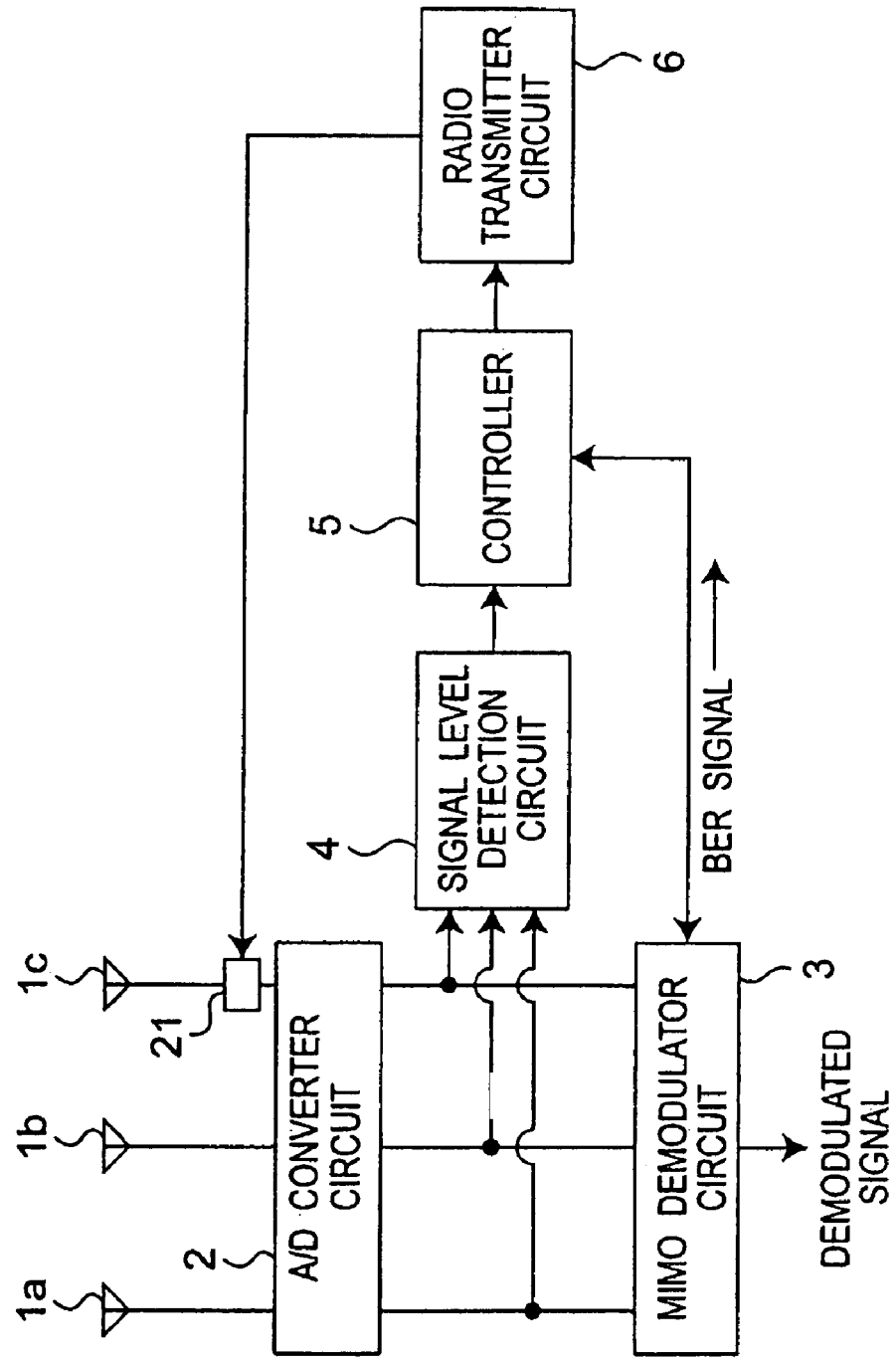
FIG. 2 is a block diagram showing a configuration of a MIMO antenna apparatus according to a modified preferred embodiment of the first preferred embodiment of the present invention.

FIG. 2 is a block diagram showing a configuration of a MIMO antenna apparatus according to a modified preferred embodiment of the first preferred embodiment. The MIMO antenna apparatus according to the modified preferred embodiment is characterized in that the transmitting antenna 7 shown in FIG. 1 is integrated with one of the receiving antenna elements 1a, 1b and 1c for MIMO reception (in the example of FIG. 2, the transmitting antenna is integrated with the antenna element 1c). Referring to FIG. 2, the antenna element 1c is equipped with an antenna duplexer 21 at its bottom. A radio signal received through the antenna element 1c is inputted into an A/D converter 2 via the antenna duplexer 21, whereas a radio signal outputted from a radio transmission circuit 6 excites the antenna element 1c via the antenna duplexer 21. The antenna duplexer 21 is used to separate a received signal from a transmitted signal in the case that the received signal and the transmitted signal differ in frequency. As an alternative, the transmitting antenna element 7 may be integrated with either the receiving antenna element 1a or 1b. With the above-stated configuration, the MIMO antenna apparatus according to the modified preferred embodiment shown in FIG. 2 can reduce the number of antenna elements in the apparatus, and accordingly, the MIMO antenna apparatus can be efficiently implemented in a small-sized mobile radio communication terminal.

Furthermore, in the modified preferred embodiment shown in FIG. 2, one configuration is taken for instance in which only one receiving antenna element is used as the transmitting antenna element, however, the present invention is not limited to such configuration. The MIMO antenna apparatus can be configured to use, as transmitting antenna elements, two or more of the receiving antenna elements 1a, 1b and 1c. By configuring in such manner, the antenna gain is expected to improve even during transmission in virtue of the beam forming effect of array antenna. Moreover, when two or more of the receiving antenna elements 1a, 1b and 1c are used as transmitting antenna elements, it is possible to provide the transmission diversity, typically including the switching diversity based on switch control, or to achieve the MIMO transmission. Accordingly, the radio signals can be transmitted in more stable manner and at higher speed. Moreover, in the modified preferred embodiment shown in FIG. 2, the configuration with the antenna duplexer 21 has been exemplarily described for separating the received signal and the transmitted signal, however, the present invention is not limited to such configuration. The MIMO antenna apparatus may be configured to employ a switch or a circulator. The switch is the best suited to the case that the signals are transmitted in time intervals different from those for receiving signals, and the circulator can be employed even when there is no difference in frequency or in time between the transmitted signal and the received signal.

Figure 3:
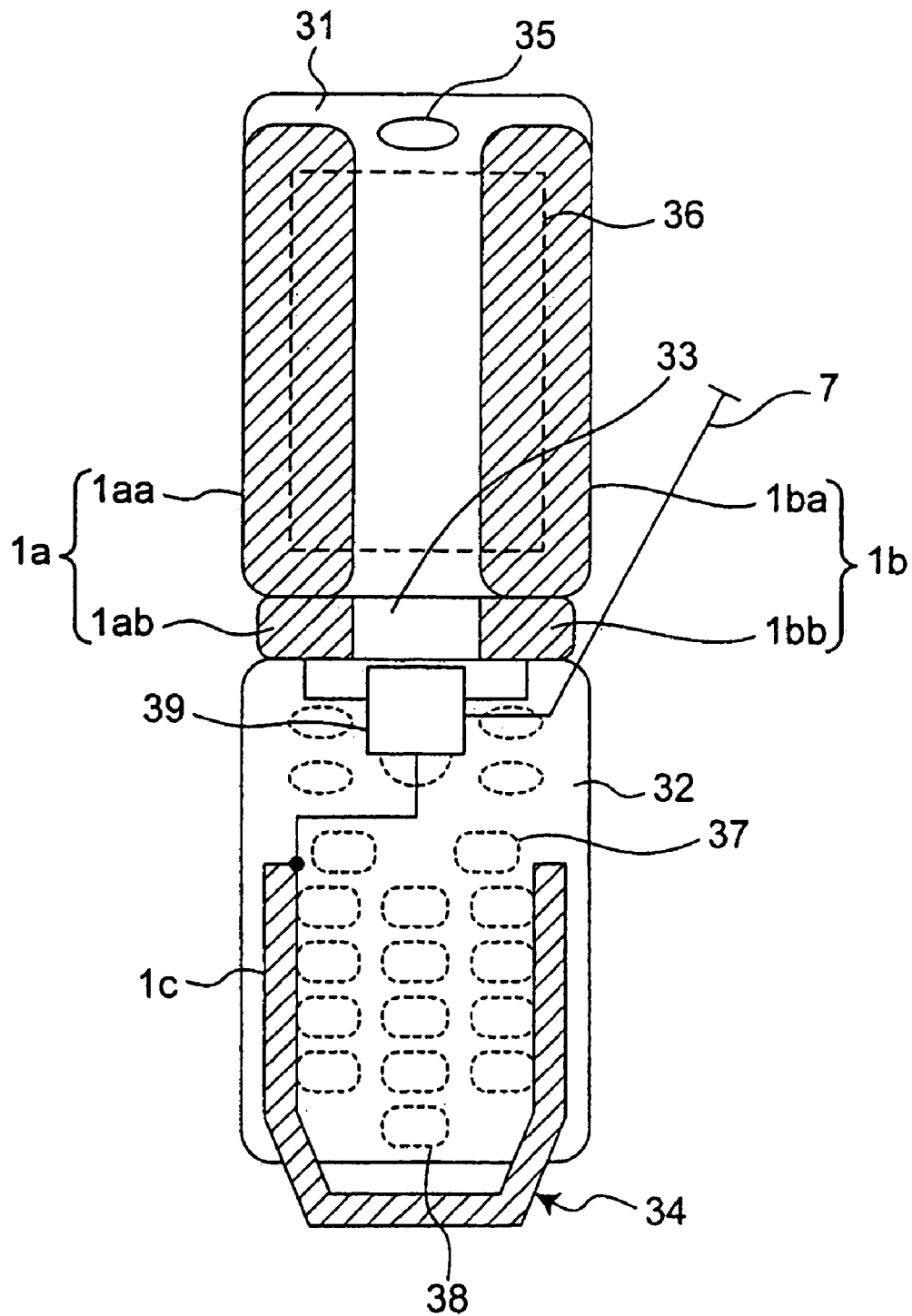
FIG. 3 is a perspective view showing a configuration of a mobile radio communication apparatus equipped with the MIMO antenna apparatus according to a first implemental example of the first preferred embodiment of the present invention.

Referring to FIGS. 3 to 6, implemental examples are described below, in each of which the MIMO antenna apparatus according to the present preferred embodiment is implemented as a mobile radio communication apparatus. FIG. 3 is a perspective view showing a configuration of a mobile radio communication apparatus equipped with the MIMO antenna apparatus according to a first implemental example of the present preferred embodiment.

The mobile radio communication apparatus shown in FIG. 3 is configured as a folding mobile telephone which includes an upper housing 31 and a lower housing 32 each substantially shaped in a rectangular parallelepiped, and in which the upper housing 31 and the lower housing 32 are connected to each other by a hinge unit 33. The upper housing 31 is configured to include a loudspeaker 35 and a display 36, and the lower housing 32 is configured to include a keyboard 37 and a microphone 38. In the upper housing 31, a strip-shaped conductor 1aa is provided so as to be proximate to a left side of the upper housing 31 and to be in parallel to a longitudinal direction of the mobile radio communication apparatus. The strip-shaped conductor 1aa is electrically connected to a hinge conductor 1ab that constitutes a part of the hinge unit 33. The strip-shaped conductor 1aa and the hinge conductor 1ab act as the receiving antenna element 1a as a whole. Similarly, in the upper housing 31, a strip-shaped conductor 1ba is provided so as to be proximate to a right side of the upper housing 31 and to be in parallel to the longitudinal direction of the mobile radio communication apparatus. The strip-shaped conductor 1ba is electrically connected to a hinge conductor 1bb that constitutes a part of the hinge unit 33. The strip-shaped conductor 1ba and the hinge conductor 1bb act as the receiving antenna element 1b as a whole. In the lower housing 32, the receiving antenna element 1c is provided which is made of a strip-shaped conductor and folded into U-shape. In the implemental example shown in FIG. 3, a part of the receiving antenna element 1c is provided so as to penetrate into a boom unit 34 that protrudes from a lower end of the lower housing 32. Alternatively, the entire receiving antenna element 1c may be provided in the lower housing 32. Additionally, the transmitting antenna element 7 made of a rod-shaped conductor is provided so as to protrude from the lower housing 32. The mobile radio communication apparatus has a radio communication circuit 39 including the A/D converter circuit 2, the MIMO demodulator circuit 3, the signal level detection circuit 4, the controller 5, the radio transmitter circuit 6 and the like shown in FIG. 1. The A/D converter circuit 2 of the radio communication circuit 39 is connected to the receiving antenna elements 1a, 1b and 1c, and the radio transmitter circuit 6 of the radio communication circuit 39 is connected to the transmitting antenna element 7.

Figure 4:
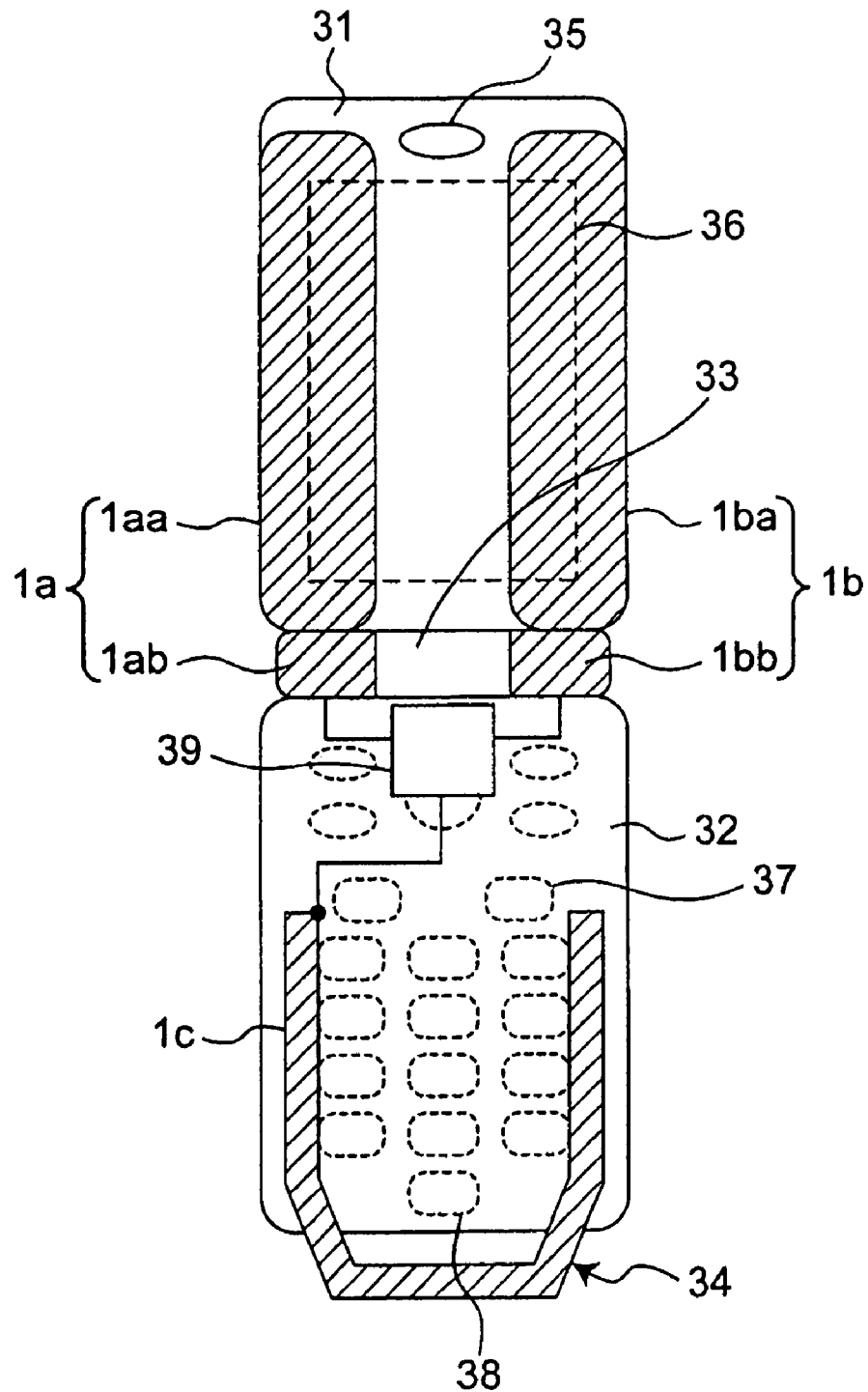
FIG. 4 is a perspective view showing a configuration of a mobile radio communication apparatus equipped with the MIMO antenna apparatus according to a second implemental example of the first preferred embodiment of the present invention.

FIG. 4 is a perspective view showing a configuration of a mobile radio communication apparatus equipped with the MIMO antenna apparatus according to a second implemental example of the present preferred embodiment. In the second implemental example, the rod-shaped antenna element 7 shown in FIG. 3 is removed. Instead of the antenna element 7, a radio communication circuit 39 further includes an antenna duplexer 21, and one of the receiving antenna elements 1a, 1b and 1c (e.g., the receiving antenna element 1a) is used to serve as both the receiving antenna element and the transmitting antenna element. According to the mobile radio communication apparatus in the implemental example shown in FIG. 4, a more compact mobile radio communication apparatus than the implemental example shown in FIG. 3 can be provided by virtue that the antenna element protruding outside of the apparatus is removed.

Figure 5:
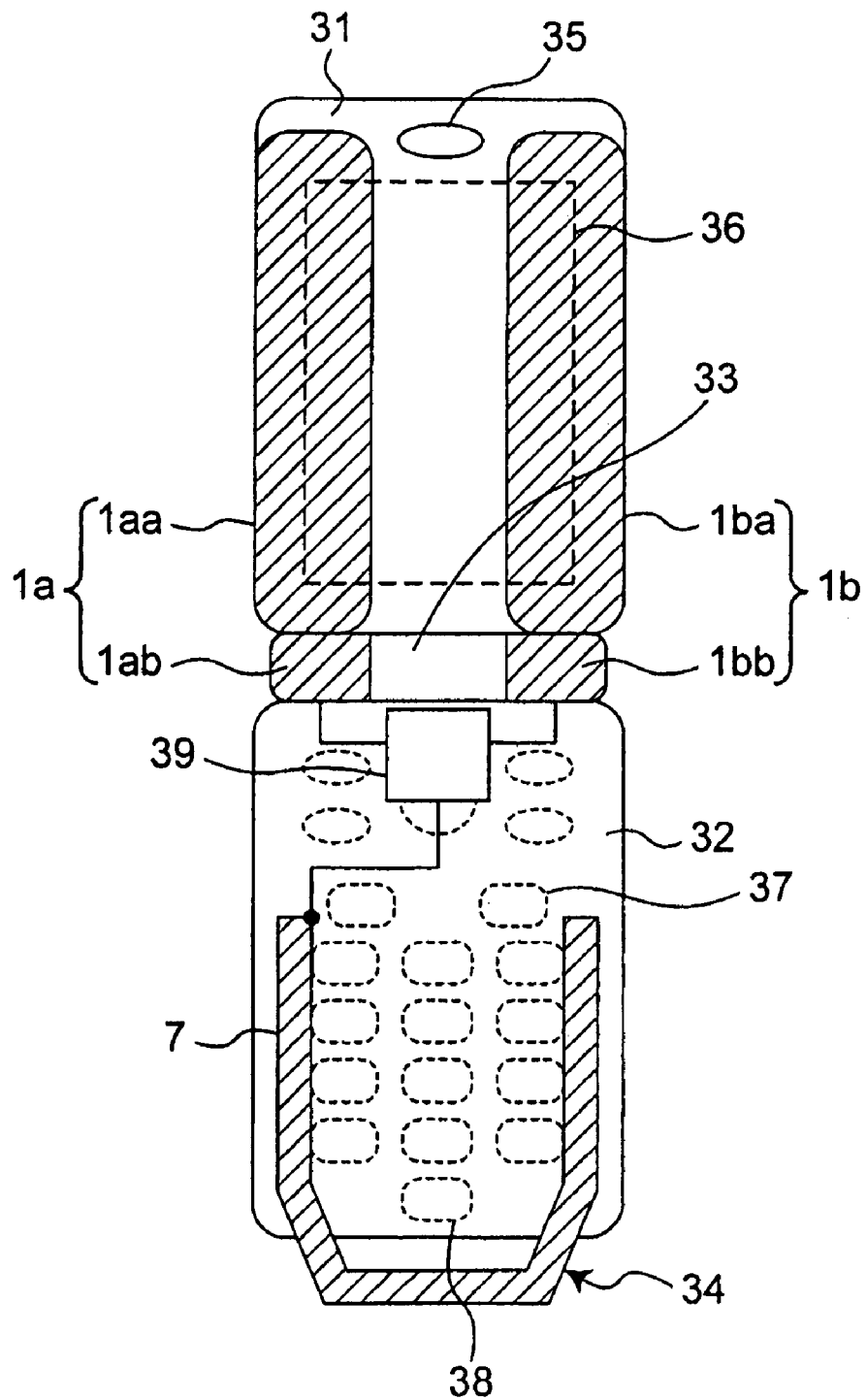
FIG. 5 is a perspective view showing a configuration of a mobile radio communication apparatus equipped with the MIMO antenna apparatus according to a third implemental example of the first preferred embodiment of the present invention.

FIG. 5 is a perspective view showing a configuration of a mobile radio communication apparatus equipped with the MIMO antenna apparatus according to a third implemental example of the present preferred embodiment. In this configuration, the mobile radio communication apparatus has two receiving antenna elements 1a and 1b provided in the upper housing 31 and one transmitting antenna element 7 provided in the lower housing 32. The mobile radio communication apparatus may optionally include an antenna duplexer 21 in the radio communication circuit 39 and use one of the receiving antenna elements 1a and 1b to serve as both of the receiving antenna element and the transmitting antenna element, for providing the transmission diversity using the two transmitting antenna elements.

Figure 6:
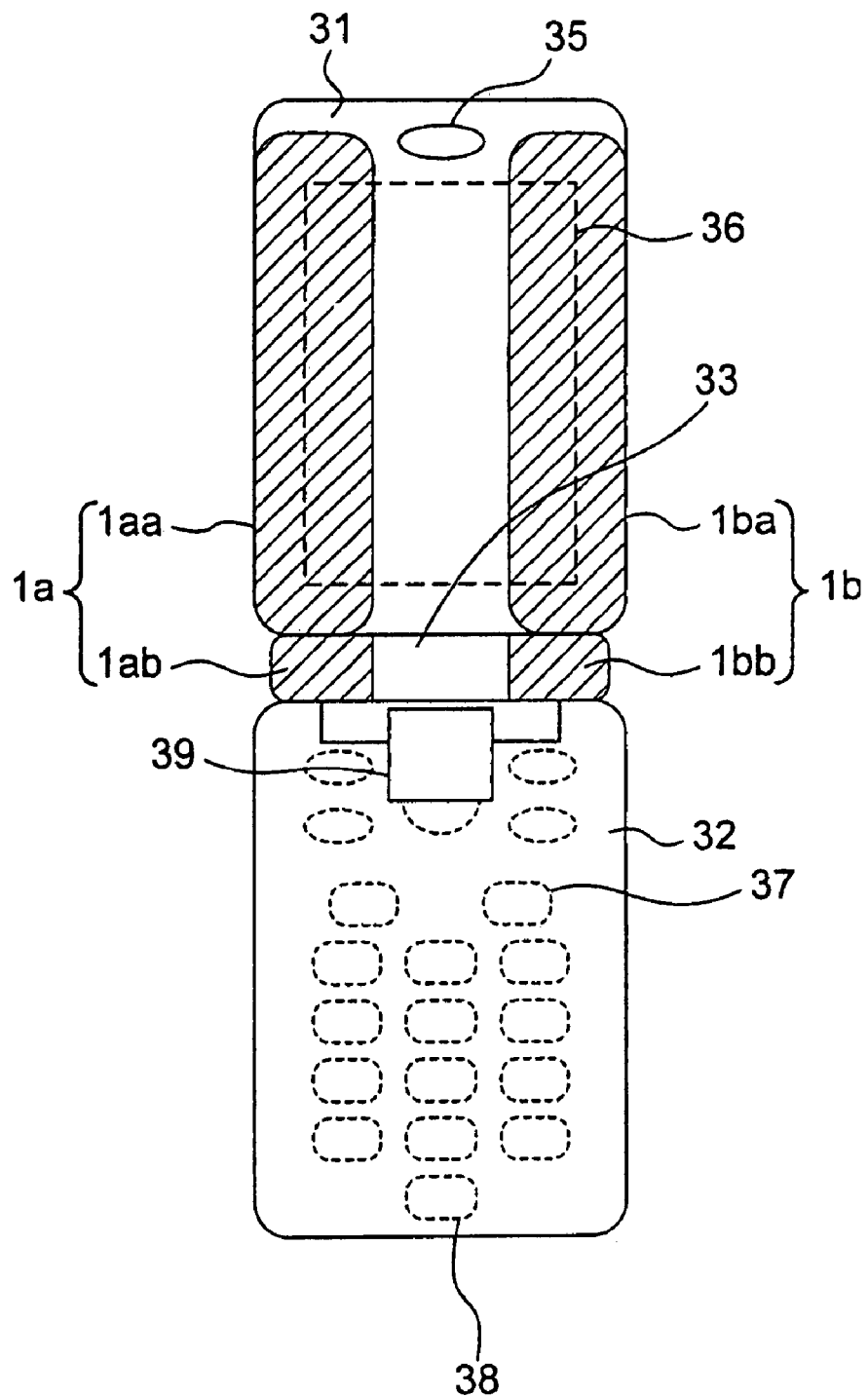
FIG. 6 is a perspective view showing a configuration of a mobile radio communication apparatus equipped with the MIMO antenna apparatus according to a fourth implemental example of the first preferred embodiment of the present invention.

FIG. 6 is a perspective view showing a configuration of a mobile radio communication apparatus equipped with the MIMO antenna apparatus according to a fourth implemental example of the present preferred embodiment. In this configuration, the mobile radio communication apparatus has two antenna elements 1a and 1b in the upper housing 31 and uses one of the antenna elements 1a and 1b to serve as both of the receiving antenna element and a transmitting antenna element. By configuring in such manner, an internal structure of the mobile radio communication apparatus can be significantly simplified as compared with those of the mobile radio communication apparatus according to the other implemental examples.

The operation principle of the MIMO antenna apparatus according to the present preferred embodiment will be described below.

The MIMO communication system falls under a technique for increasing a transmission capacity and for increasing a total transmission rate in relation to a plurality of signal sequences after MIMO demodulation, by employing a plurality of antenna elements in each of a transmitter and a receiver and spatially multiplexing the plurality of signal sequences simultaneously transmitted in the same frequency band. In the present specification, the MIMO communication system is described based on an eigenmode transmission scheme by way of example. It is supposed that the number of antenna elements in each of the transmitter and the receiver is n, then the received signal y is expressed by the following equation:

$$y = Hx + w \quad (1),$$

where symbol y denotes a received signal and is of a vector with a size of n, and each element of the vector denotes a signal received through each one of the antenna elements of the receiver. Symbol H denotes a matrix with a size of n*n, the matrix is called "channel matrix", and each element HU of the matrix denotes a propagation coefficient between a j-th antenna element of the transmitter and an i-th antenna element of the receiver, i.e., amounts of phase rotation and amplitude attenuation for the signal transmitted between these antenna elements. Furthermore, symbol x denotes a transmitted signal and is of a vector with a size of n, and each element $x_i$ of the vector is a signal transmitted from each one of the antenna elements of the transmitter and orthogonal to the other signals. Symbol w is of a vector with a size of n, and each element of the vector denotes a thermal noise received through each one of the antenna elements of the receiver.

For obtaining the channel matrix H at the receiver, the receiver stores therein a predetermined pilot signal x in advance, the transmitter transmits this known pilot signal x to the receiver, and the receiver calculates the channel matrix H by using the equation (1) based on the pilot signal x previously stored in the receiver and the received signal y (i.e., the transmitted pilot signal x).

Then, by carrying out a singular value decomposition (SVD) on the channel matrix H, the following equation (2) is obtained:

$$H = U\Sigma V^H = \sum_{i=1}^{q} \sigma_i u_i v_i^H, \quad (2)$$

where symbols U, Σ and V denote matrixes each with a size of n*n, and the matrix Σ consists of $\sigma_i$ ($0 \leq i \leq q$) at i-th row and an i-th column elements and 0 at the other elements. Further, symbol $u_i$ denotes i-th column vector of the matrix U, and is orthogonal to the other column vectors, and similarly, symbol $v_i$ denotes i-th column vector of the matrix V, and is orthogonal to the other vectors. Symbol q denotes a rank of the channel matrix H, and let q=n in the following description. A superscript H denotes a complex conjugate transposition. Further, the matrixes U and V satisfy the following equation (3):

$$U^H U = I_n \quad (3), \text{ and}$$

$$V^H V = I_n \quad (4),$$

where the symbol $I_n$ is a identity matrix with a size of n*n.

Moreover, by carrying out eigenvalue decomposition (EVD), the following equation (5) is obtained:

$$HH^H = U\Sigma V^H (U\Sigma V^H)^H = U\Sigma\Sigma^H U^H = \sum_{i=1}^{q} \lambda_i u_i u_i^H, \quad (5)$$

where symbol $\lambda_i$ denotes eigenvalues of a channel matrix product $HH^H$ and satisfies $\lambda_i = \sigma_i^2$.

A vector $u_i^H$ is orthogonal to the other row vectors of the matrix UH, and used as weight coefficients (amplitudes and phases) for the signals transmitted from the respective antenna elements of the transmitter. The vector $u_i$ is orthogonal to the other column vectors of the matrix U, and used as weight coefficients (amplitudes and phases) for the signals received at the respective antenna elements of the receiver. By using the weight coefficients in such manner, a directivity that the signals are orthogonal to one another can be obtained.

Now, according to the equation (1), respective powers of the received signals are represented as: $Hx(Hx)^H = HH^H xx^H$. The matrix $xx^H$ represents respective powers of the transmitted signals. It is to be noted that since the respective elements of the vector x are the signals orthogonal to one another, the matrix $xx^H$ is a diagonal matrix diag $[x_1 x_1^*, x_2 x_2^*, \ldots, x_n x_n^*]$ and the matrix $HH^H$ is a diagonal matrix diag $[\lambda_1, \lambda_2, \ldots, \lambda_q]$. Namely, by employing the orthogonal weight coefficients for the respective antenna elements in each of the transmitter and the receiver, a plurality of propagation channels can be separated, and in this case, the respective powers of the received signals are $\lambda_i x_i x_i^*$. If all the signals $x_1$ are equal to each other, the powers of the received signals in the respective propagation channel are proportional to the eigenvalues $\lambda_i$.

Here, it is specifically described how to derive the powers of received signals, by taking a MIMO communication system as an example in which a transmitter has two antenna elements and a receiver has two antenna elements. In this case, the channel matrix H, and the transmitted signal vector x including the signals transmitted from the antenna elements of the transmitter are expressed by the following equations (6) and (7), respectively:

$$H = \begin{bmatrix} H_{11} & H_{12} \\ H_{21} & H_{22} \end{bmatrix}, \text{ and} \quad (6)$$

$$x = \begin{bmatrix} x_1 \\ x_2 \end{bmatrix}. \quad (7)$$

Now, suppose that the symbol w denotes a noise vector (ratio in amplitude with respect to the transmitted signal vector x) including the noises received through the antenna elements of the receiver, then a received signal vector y is expressed by the following equation (8):

$$y = H \cdot x + w \quad (8)$$

$$= \begin{bmatrix} H_{11} & H_{12} \\ H_{21} & H_{22} \end{bmatrix} \begin{bmatrix} x_1 \\ x_2 \end{bmatrix} + \begin{bmatrix} w_1 \\ w_2 \end{bmatrix}$$

$$= \begin{bmatrix} y_1 \\ y_2 \end{bmatrix}.$$

Next, a covariance matrix $R_{yy}$ of the received signal vector y is calculated from the following equation (9):

$$R_{yy} = y \cdot y^H \quad (9)$$

$$= \begin{bmatrix} y_1 \\ y_2 \end{bmatrix} \cdot [y_1^* \quad y_2^*].$$

The vector $y^H$ in the equation (9) is expressed by the following equation (10):

$$y^H = [\, y_1^* \quad y_2^* \,] \quad (10)$$

$$= [\, x_1^* \quad x_2^* \,] \begin{bmatrix} H_{11}^* & H_{12}^* \\ H_{21}^* & H_{22}^* \end{bmatrix} [\, w_1^* \quad w_2^* \,].$$

Generally speaking, in the MIMO communication system, different signals transmitted from the different antenna elements of the transmitter are uncorrelated to one another. The meaning of term "uncorrelated signals" is described below. It is supposed that a transmitted signal sequence is a one-dimensional signal sequence consisting of elements "−1" and "1". For example, consider a case that each of the transmitted signal vectors $x_1$ and $x_2$ includes the following four elements:

$$x_1 = (1, -1, 1, 1) \quad (11), \text{ and}$$

$$x_2 = (1, 1, -1, 1) \quad (12).$$

Under a definition of "correlation", i.e., a sum of products of the corresponding elements in the respective signal sequences divided by the length of the signal sequences, a correlation value $R_{12}$ between the transmitted signal vectors $x_1$ and $x_2$ is expressed by the following equation (13):

$$R_{12} = (1*1 + (-1)*1 + 1*(-1) + 1*1)/4 = 0 \quad (13).$$

Namely, if the correlation value $R_{12}$ is 0, the transmitted signal vectors $x_1$ and $x_2$ are uncorrelated to each other. Conversely, the correlation value $R_{12}$ is 1 in the case that the transmitted signal vectors $x_1$ and $x_2$ are equal, i.e., $x_1 = x_2$. Furthermore, the noise vector is uncorrelated to the transmitted signal vectors, and the noise vectors received through different antenna elements are uncorrelated to one another.

Accordingly, as the powers of the received signals, an expectation of the covariance matrix $R_{yy}$ of the equation (9) can be calculated by the following equation (14):

$$R_{yy} = \begin{bmatrix} y_1 \\ y_2 \end{bmatrix} [\, y_1^* \quad y_2^* \,] \quad (14)$$

$$= \begin{bmatrix} H_{11} & H_{12} \\ H_{21} & H_{22} \end{bmatrix} \begin{bmatrix} x_1 \\ x_2 \end{bmatrix} [\, x_1^* \quad x_2^* \,] \begin{bmatrix} H_{11}^* & H_{21}^* \\ H_{12}^* & H_{22}^* \end{bmatrix} +$$

$$\begin{bmatrix} w_1 \\ w_2 \end{bmatrix} \cdot [\, w_1^* \quad w_2^* \,]$$

$$= \begin{bmatrix} H_{11} & H_{12} \\ H_{21} & H_{22} \end{bmatrix} \begin{bmatrix} H_{11}^* & H_{21}^* \\ H_{12}^* & H_{22}^* \end{bmatrix} + \begin{bmatrix} |w_1|^2 & w_1 w_2^* \\ w_2 w_1^* & |w_2|^2 \end{bmatrix}$$

$$= H \cdot H^H + \begin{bmatrix} |w_1|^2 & 0 \\ 0 & |w_2|^2 \end{bmatrix}$$

$$= H \cdot H^H + |w|^2 \begin{bmatrix} 1 & 0 \\ 0 & 1 \end{bmatrix},$$

where the following equation (15) is employed from the assumption on the transmitted signal vectors:

$$R_{xx} = \begin{bmatrix} x_1 \\ x_2 \end{bmatrix} [\, x_1^* \quad x_2^* \,] \quad (15)$$

$$= \begin{bmatrix} |x_1|^2 & x_1 x_2^* \\ x_2 x_1^* & |x_2|^2 \end{bmatrix}$$

$$= \begin{bmatrix} 1 & 0 \\ 0 & 1 \end{bmatrix}.$$

According to the operation principle of the MIMO antenna apparatus described above, a transmission capacity $C_{MIMO}$ of the MIMO communication system is obtained by the following equation (16):

$$C_{MIMO} = \log_2 \left| I_n + \frac{SNR}{n} H H^H \right| = \sum_{i=1}^{q} \log_2 \left( 1 + \frac{SNR}{n} \lambda_i \right), \quad (16)$$

where symbol SNR denotes a total transmitted signal power-to-noise ratio, i.e., satisfies $SNR/n = x_1 x_i^*$. The unit of the transmission capacity $C_{MIMO}$ is [bit/sec/Hz]. On the other hand, in case of normal one-to-one communication (SISO) in which the transmitter employs one antenna element and the receiver employs one antenna element, a transmission capacity $C_{SISO}$ is obtained by the following equation (17):

$$C_{SISO} = \log_2(1 + SNR \cdot hh^*) \quad (17),$$

where symbol h denotes a propagation coefficient, and the unit of the transmission capacity $C_{SISO}$ is [bit/sec/Hz].

It is supposed that for example, $hh^* = \lambda_i = \lambda$ and $SNR \cdot \lambda / n \gg 1$ for simplification of comparison between the equations (16) and (17). In this case, the transmission capacity $C_{MIMO}$ expressed by the equation (16) is calculated as shown in the following equation (18):

$$C_{MIMO} = n \cdot (\log_2(SNR \cdot \lambda) - \log_2(n)) \quad (18).$$

Furthermore, the transmission capacity $C_{SISO}$ expressed by the equation (17) is calculated as shown in the following equation (19):

$$C_{SISO} = \log_2(SNR \cdot \lambda) \quad (19).$$

In a case of n=4 and $SNR*\lambda=1024$, for example, the MIMO transmission capacity $C_{MIMO}=4*(10-2)=32$ [bit/sec/Hz] and a SISO transmission capacity $C_{SISO}=10$ [bit/sec/Hz]. Therefore, it is understood that the MIMO transmission capacity increases more than the SISO transmission capacity.

In such manner, the MIMO antenna apparatus spatially multiplexes signals and increases the transmission capacity by allocating to each of the signal sequences the directivity that signals are orthogonal to one another, and accordingly, the total transmission rate of the MIMO-demodulated signal sequences can be improved.

According to the equation (16), it can be seen that the greater the eigenvalues $\lambda_i$ calculated from the channel matrix H become, the more the MIMO transmission capacity increases. This means that higher-rate transmission can be achieved as the respective elements of the channel matrix H increase, since the eigenvalues $\lambda_i$ are obtained by the respective elements of the channel matrix H. Moreover, as expressed in the equation (1), the received signal vector includes the thermal noise vector w. Because thermal noise components can not be eliminated in the actual receiver, it causes errors when calculating the eigenvalues $\lambda_i$ from the channel matrix H. Accordingly, in order to improve the transmission rate of the MIMO antenna apparatus, the powers of the received signals are to be made as large as possible.

On the other hand, if interference waves are present, the equation (1) is expressed by the following equation (20):

$$y = Hx + H_i + w \tag{20}$$

where symbol $H_i$ denotes a vector with a size of n, and each element thereof denotes interference wave signals received through each of the antenna elements of the receiver. The term "interference wave signals" means cochannel interference wave signals arrived from a neighboring base station with the same frequency, or desired wave signals which have been arrived as delayed signals due to transmission via different long paths. In an analog radio communication such as television broadcast or radio broadcast, the delayed wave signals degrade, for example, the quality of screen appearance as ghosts in the television broadcast. In contrast, in a digital radio communication, thermal noises, cochannel interference wave signals, and delay wave signals directly affect a desired wave signal as bit errors of the desired wave signal, and degrade the signal quality of the desired wave signal.

In the equation (20), if the respective elements of the vectors $H_i$ and w are sufficiently smaller than the respective elements of the vector Hx, high-speed communication can be achieved due to high SINR. However, if the respective elements of the vectors $H_i$ and w reach unnegligible levels, the performance of the error rate of the demodulated signal is greatly deteriorated. For example, in case of QPSK modulation, a SINR of about 13 dB is needed to satisfy an error rate of $10^{-6}$.

Then, according to the equation (20), the causes for degrading the quality of the demodulated signal are classified into a factor of the interference wave vector $H_i$ and a factor of the thermal noise vector w. Since the thermal noises are determined by a bandwidth of the modulated signal and the noise performance of the receiver, the variations of the thermal noises depending on surrounding environment are small. Namely, the deterioration of the SINR occurs mainly when the received signal levels decrease. On the other hand, even when the received signal levels are large, if the signal levels of the interference wave signals are also large, the SINR is relatively small. Accordingly, if the signal quality of the demodulated signal is deteriorated, it is important to judge whether the deterioration results from the decreases in the received signal levels or from the presence of the interference wave signals. In this case, the signal quality is a bit error rate (BER), a packet error rate, or a throughput. Considering the above-stated operation principle, a method for controlling the MIMO antenna apparatus according to the present preferred embodiment will be described below.

Figure 7:
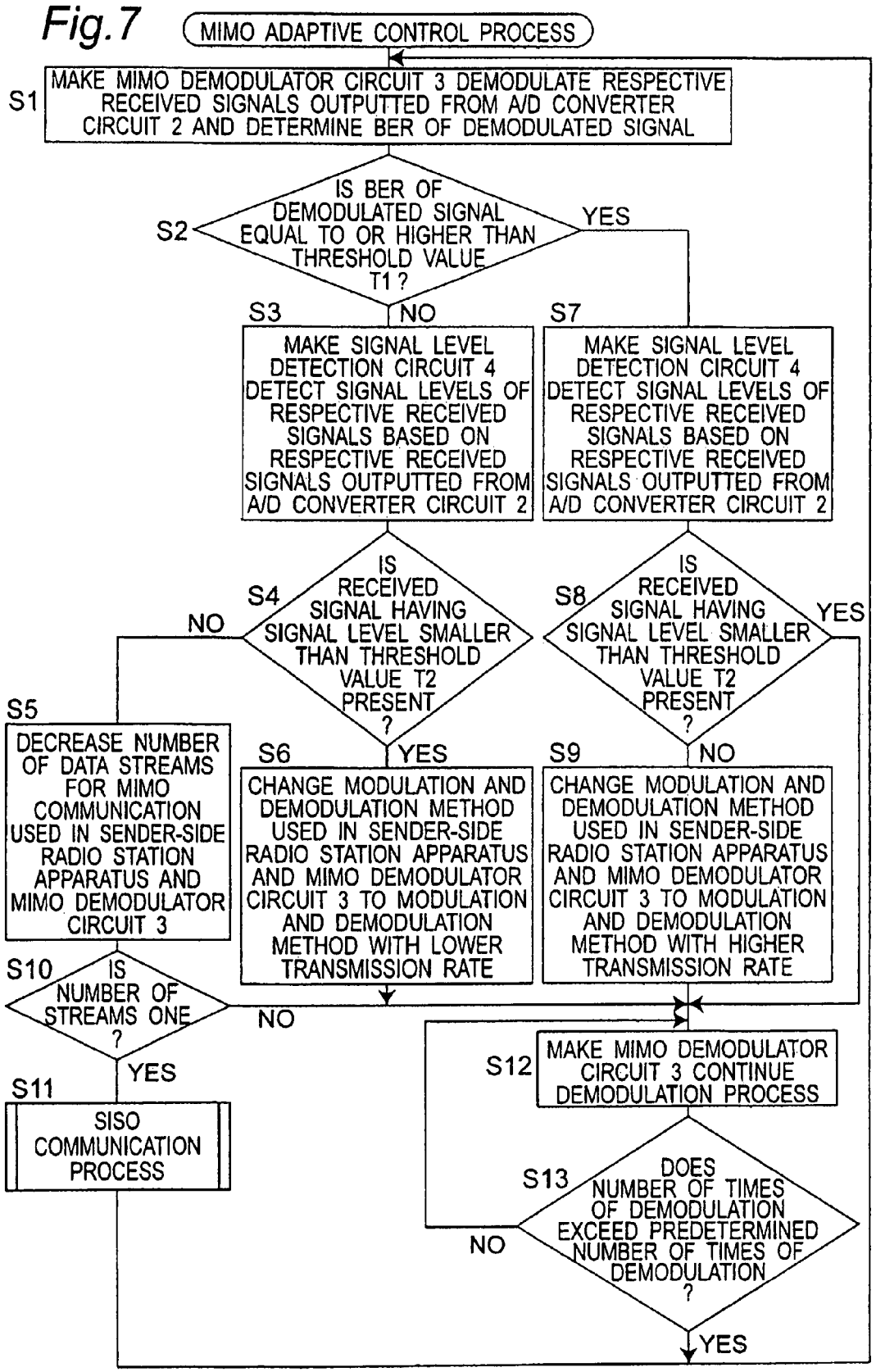
FIG. 7 is a flowchart showing a control flow of MIMO adaptive control process performed by the controller 5 shown in FIG. 1.

FIG. 7 is a flowchart showing a control flow of MIMO adaptive control process performed by the controller 5. In the initial state, the MIMO antenna apparatus and the sender-side radio station apparatus perform a MIMO communication using three data streams and a certain modulation and demodulation method. The MIMO antenna apparatus is receiving radio signals by using all of its three receiving antenna elements 1a, 1b and 1c. Referring to FIG. 7, in Step S1, the controller 5 makes the MIMO demodulator circuit 3 demodulate the respective received signals outputted from the A/D converter circuit 2 to output one demodulated signal, and determine the BER of the demodulated signal as the signal quality of the demodulated signal, and further, the controller 5 obtains the result of the determination from the MIMO demodulator circuit 3. In Step S2, the controller 5 judges whether or not the BER of the demodulated signal is equal to or higher than a predetermined threshold value T1. If the BER is lower than the threshold value T1, the control flow goes to Step S3. If the BER is equal to or higher than the threshold value T1, the control flow goes to Step S7. At Step S2, in the case that the MIMO demodulator circuit 3 obtains an instantaneous BER (i.e., the BER measured for quite a short time interval), the threshold value T1 for the BER is set to, for example, $10^{-6}$. In the case that the MIMO demodulator circuit 3 obtains a time-averaged BER for predetermined time interval in consideration of a multiple wave environment caused by the Rayleigh Fading, the threshold value T1 is set to, for example, $10^{-2}$. In Step S3, the controller 5 makes the signal level detection circuit 4 detect signal levels of the respective received signals based on the respective received signals outputted from the A/D converter circuit 2, and obtains the results of the detection from the signal level detection circuit 4. In Step S4, the controller 5 determines whether or not the received signal having the signal level smaller than a predetermined threshold value T2 is present. If the signal levels of all the received signals are equal to or larger than the threshold value T2, the control flow goes to Step S5; otherwise, the control flow goes to Step S6.

Figure 9:
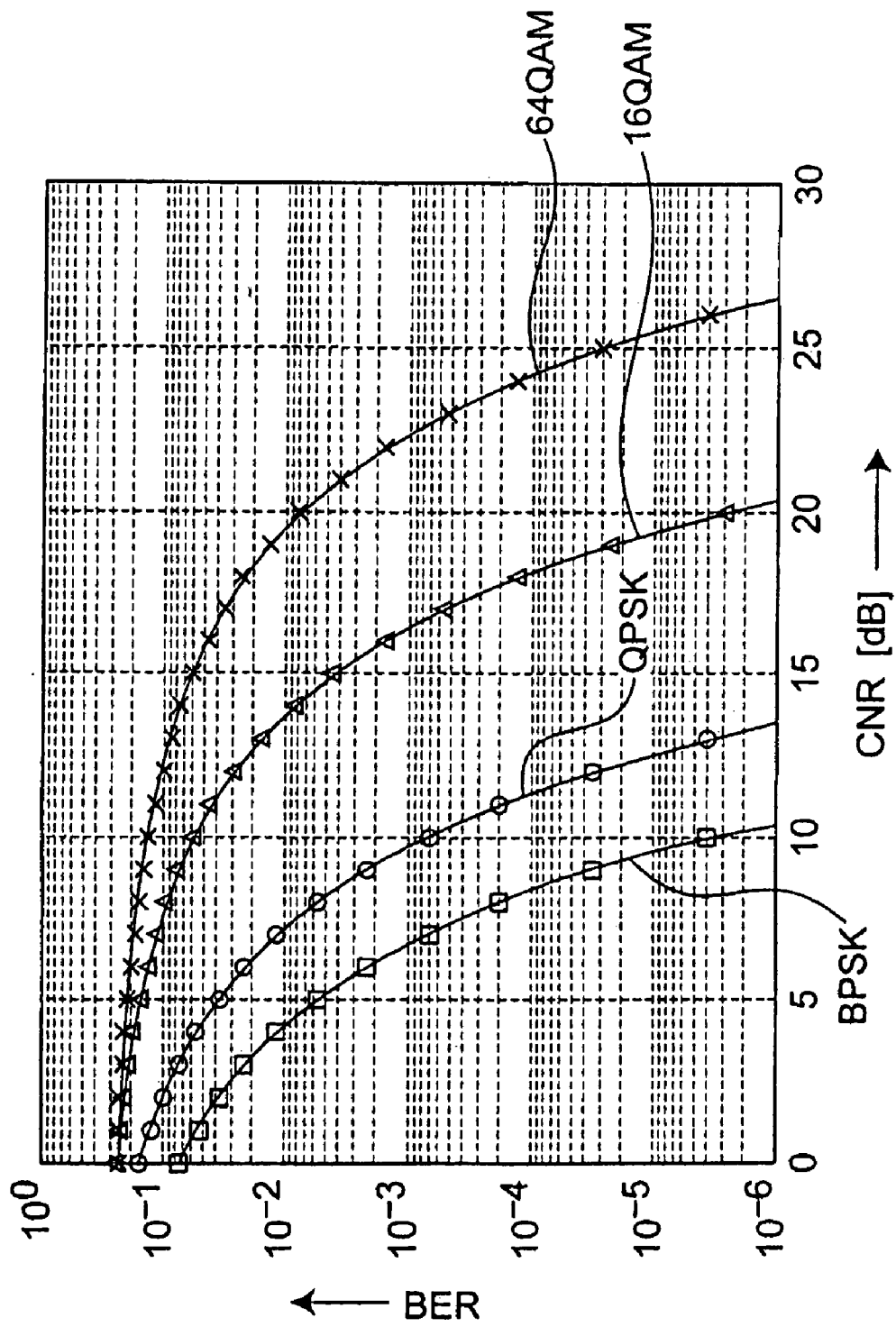
FIG. 9 is a graph showing instantaneous CNR and BER for explaining determination based on a threshold value in the MIMO adaptive control process shown in FIG. 7.
Figure 10:
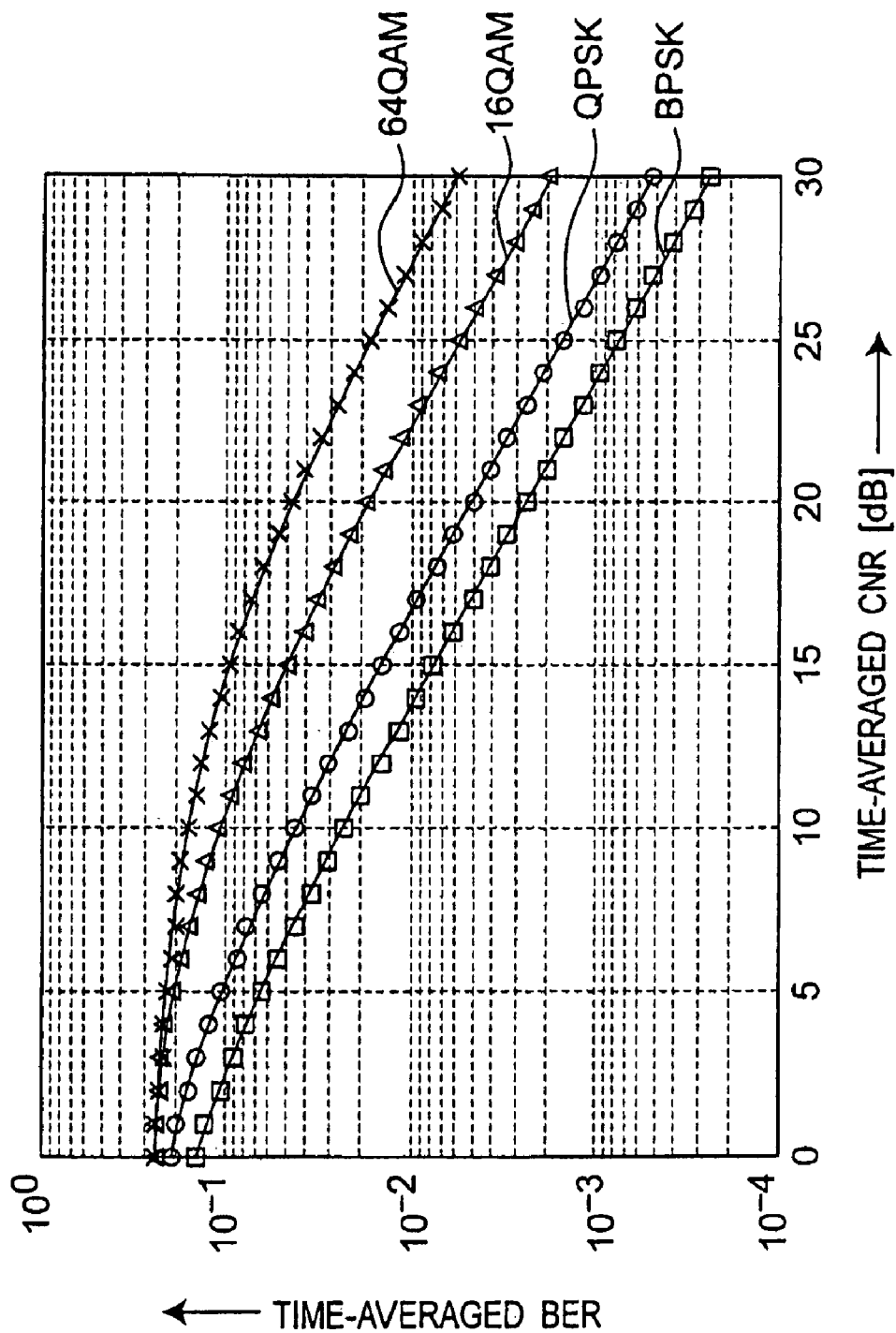
FIG. 10 is a graph showing time-averaged CNR and BER for explaining determination based on a threshold value in the MIMO adaptive control process shown in FIG. 7.

In this case, the threshold value T2 for the signal levels of the received signals depends on (a) the modulation and demodulation method used in the MIMO antenna apparatus and in the sender-side radio station apparatus (i.e., BPSK, QPSK, 16QAM or 64QAM), and (b) whether the signal quality of the demodulated signal and the signal levels of the respective received signals are obtained as instantaneous values or as time-averaged values. Referring to FIGS. 9 and 10, the determination of the signal levels of the respective received signals using the threshold value T2 will be described as follows. In the graphs of FIGS. 9 and 10, the CNR is used as an example of the signal level of each received signal. FIG. 9 is a graph showing the instantaneous CNR and BER. In this case, for each one of the plurality of modulation and demodulation methods, the threshold value for the CNR is set to a value corresponding to BER=$10^{-6}$ set as the threshold value for the instantaneous BER. Namely, if the modulation and demodulation method is BPSK, the CNR is set to 11 dB. If it is QPSK, the CNR is set to 14 dB. If it is 16QAM, the CNR is set to 21 dB. If it is 64QAM, the CNR is set to 27 dB. FIG. 10 is a graph showing the time-averaged CNR and BER. In this case, for each one of the plurality of modulation and demodulation methods, the threshold value for the CNR is set to a value corresponding to BER=$10^{-2}$ set as the threshold value for the time-averaged BER. Namely, if the modulation and demodulation method is BPSK, the CNR is set to 14 dB. If it is QPSK, the CNR is set to 17 dB. If it is 16QAM, the CNR is set to 23 dB. If it is 64QAM, the CNR is set to 28 dB. The threshold value T2 for the signal levels is not limited to the above values, but can be set to a value corresponding to an error-free signal level (e.g., in electric power) for each one of the plurality of used modulation and demodulation methods.

In Step S5, the controller 5 decreases the number of data streams for a MIMO communication used in the sender-side radio communication apparatus and in the MIMO demodulator circuit 3. For example, if the sender-side radio communication apparatus and the MIMO antenna apparatus have been performing a MIMO communication using three data streams, the controller 5 changes the communication method so that the sender-side radio communication apparatus and the MIMO antenna apparatus perform a MIMO communication using two data streams or perform a SISO communication using one data stream. When the number of data streams has become one by decreasing the number of data streams in Step S5 (i.e., when Step S10 is YES), the control flow goes to a SISO communication process of Step S11; otherwise (i.e., Step S10 is NO), the control flow goes to Step S12.

Figure 8:
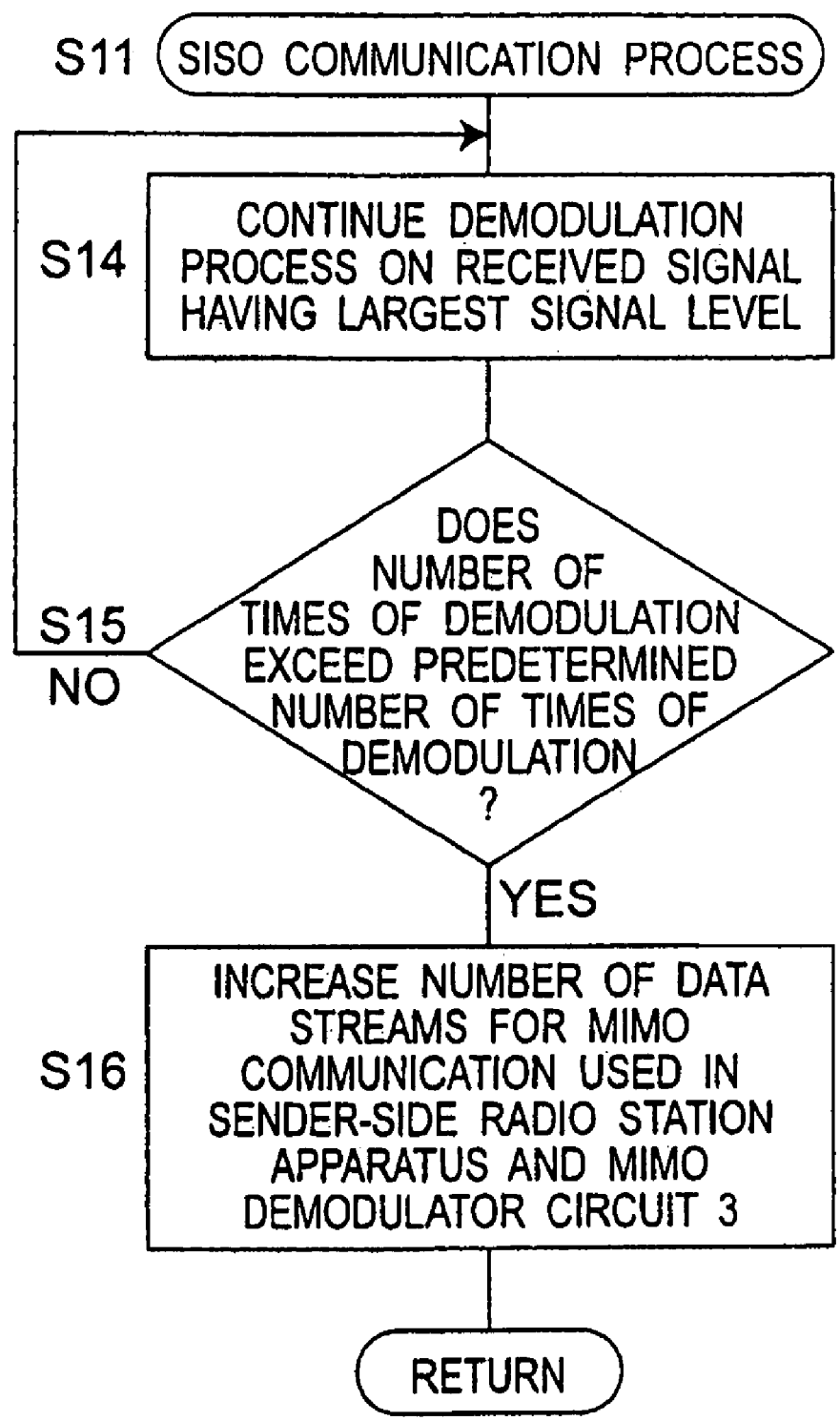
FIG. 8 is a sub-routine flowchart showing a control flow of SISO communication process of Step S11 shown in FIG. 7.

FIG. 8 is a sub-routine flowchart showing the SISO communication process of Step S11 of FIG. 7. Referring to FIG. 8, in Step S14, the controller 5 makes the MIMO demodulator circuit 3 continue the demodulation process (i.e., demodulation process of the SISO communication) only on a signal received through the receiving antenna element through which the signal having the largest signal level is received. In Step S15, the controller 5 determines whether or not the number of times of demodulation process performed by the MIMO demodulator circuit 3 exceeds a predetermined maximum number of times of demodulation. The maximum number of times of demodulation is determined as a period for monitoring the radio wave conditions. Alternatively, in Step S15, the controller 5 may determine whether or not a predetermined timeout period expires after the demodulation process performed by the MIMO demodulator circuit 3 continues for a predetermined time interval, instead of comparing the number of times of demodulation with the maximum number of times of demodulation. The demodulation process continues by repeating Step S14 until it is determined in Step S15 that the number of times of demodulation exceeds the maximum number of times of demodulation. If the number of times of demodulation exceeds the maximum number of times of demodulation, then in Step 16, the controller 5 increases the number of data streams for the MIMO communication used in the sender-side radio station apparatus and in the MIMO demodulator circuit 3, and changes the communication method from the SISO communication to the MIMO communication. In Step S16, preferably, the controller 5 initializes the number of data streams to the maximum value (i.e., three). After increasing the number of data streams, the control flow returns to Step S1.

As an alternative, the process can be configured such that the controller 5 determines, in Step S10, whether or not the number of data streams has been decreased to a certain number other than one (e.g., 2), and if YES, the controller 5 performs only Step S16 of FIG. 8, instead of the SISO communication process of Step S11. In this case, the range over which the number of the data streams varies is limited, and the number of data streams can be changed so as to perform only the MIMO communication and not to perform the SISO communication.

Referring back to FIG. 7, in Step S6, the controller 5 changes the modulation and demodulation method used in the sender-side radio station apparatus and in the MIMO demodulator circuit 3 to a modulation and demodulation method with a lower transmission rate than the current transmission rate. For example, if the sender-side radio station apparatus and the MIMO demodulator circuit 3 have been performing a MIMO communication using 64QAM, the controller 5 changes the MIMO communication so as to use one of the modulation and demodulation methods of 16QAM, QPSK and BPSK. After changing the modulation and demodulation method, the control flow goes to Step S12 of FIG. 7.

In Step S2, if the BER of the demodulated signal is equal to or higher than the threshold value T1, the control flow goes to Step S7 as stated above. In Step S7, in the same manner as that of Step S3, the controller 5 makes the signal level detection circuit 4 detect the signal levels of the respective received signals based on the respective received signals outputted from the A/D converter circuit 2, and obtains the results of the detection from the signal level detection circuit 4. In Step S8, the controller 5 determines whether or not the received signal having the signal level smaller than the threshold value T2 of Step S4 is present. If the signal levels of all the received signals are equal to or larger than the threshold value T2, the control flow goes to Step S9; otherwise, the control flow goes to Step S12. In Step S9, the controller 5 changes the modulation and demodulation method used in the sender-side radio station apparatus and in the MIMO demodulator circuit 3 to a modulation and demodulation method with a higher transmission rate than the current transmission rate. For example, if the sender-side radio station apparatus and the MIMO demodulator circuit 3 have been performing a MIMO communication using BPSK, the controller 5 changes the MIMO communication so as to use one of the modulation and demodulation methods: QPSK, 16QAM and 64QAM. After changing the modulation and demodulation method, the control flow goes to Step S12. In Step S12, the controller 5 makes the MIMO demodulator circuit 3 continue the demodulation process. In Step S13, the controller 5 determines whether or not the number of times of the demodulation process performed by the MIMO demodulator circuit 3 exceeds a predetermined maximum number of times of demodulation (e.g., equal to the maximum number of times of demodulation in Step S15). If the number of times of demodulation exceeds the maximum number of times of demodulation, the control flow returns to Step S1; otherwise, the control flow returns to Step S12 at which the controller 5 makes the MIMO demodulator circuit 3 continue the demodulation process. In a modified preferred embodiment, when the BER of the demodulated signal is equal to or higher than the threshold value T1 in Step S2, the control flow may return to Step S1 and make the MIMO demodulator circuit 3 continue the demodulation process, without carrying out Steps S7 to S9.

As described so far, the MIMO antenna apparatus according to the present preferred embodiment decreases the number of data streams for the MIMO communication method, and/or changes the modulation and demodulation method for the MIMO communication method, based on the signal quality of the demodulated signal and the signal levels of the respective received signals. Therefore, according to the present preferred embodiment, the MIMO antenna apparatus can be provided which, even if it is small in size, can perform a high quality and high-speed communication by adaptively controlling the number of data streams and the modulation and demodulation method for the MIMO communication method in the case that the desired receiving quality is not achieved. Additionally, according to the present preferred embodiment, the mobile radio communication apparatus with such MIMO antenna apparatus can be provided.

Second Preferred Embodiment

Figure 11:
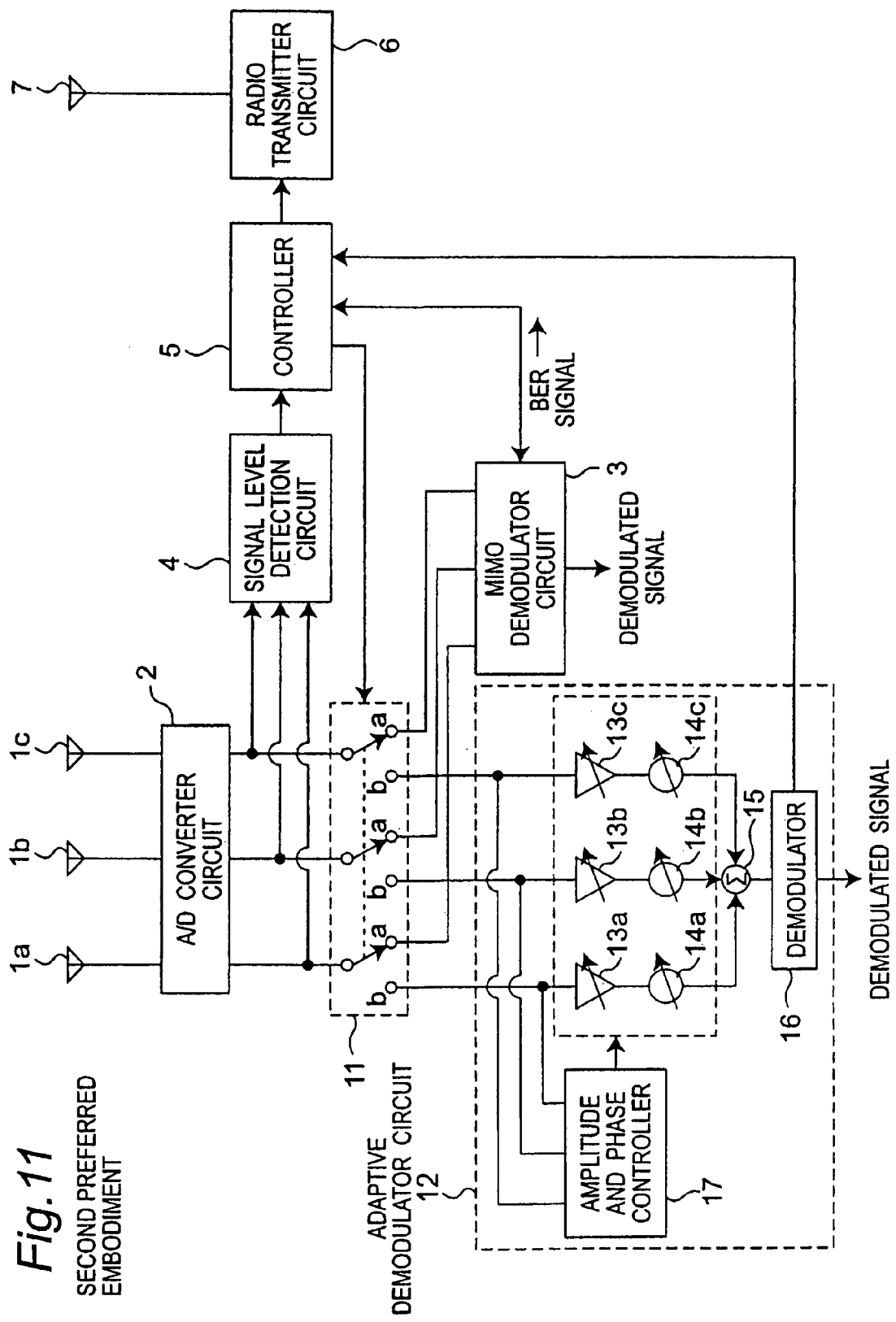
FIG. 11 is a block diagram showing a configuration of the MIMO antenna apparatus according to a second preferred embodiment of the present invention.

FIG. 11 is a block diagram showing a configuration of a MIMO antenna apparatus according to a second preferred embodiment of the present invention. The MIMO antenna apparatus according to the present preferred embodiment is characterized by having, in addition to the constituent elements of the MIMO antenna apparatus shown in FIG. 1, an adaptive demodulator circuit 12, and a switch circuit 11 for connecting an A/D converter circuit 2 to either a MIMO demodulator circuit 3 or the adaptive demodulator circuit 12. The MIMO antenna apparatus according to the present preferred embodiment is also characterized in that if any interference wave signal is received, the switch circuit 11 is moved under predetermined conditions so that the adaptive demodulator circuit 12 performs a demodulation process using recurrent and repetitive calculations.

The switch circuit 11 includes three switches corresponding to three received signals outputted from the A/D converter 2, respectively. These switches input the three received signals into either the MIMO modulator circuit 3 or the adaptive demodulator circuit 12, under control of a controller 5. If the three received signals are inputted into the adaptive demodulator circuit 12, the amplitudes of these received signals are adjusted by amplitude adjusters 13a, 13b and 13c, respectively, and then, the phases of these received signals are adjusted by phase shifters 14a, 14b and 14c, respectively. The amounts of amplitude adjustment of the amplitude adjusters 13a, 13b and 13c and the amounts of phase shift of the phase shifters 14a, 14b and 14c are controlled by an amplitude and phase controller 17, which obtains the three received signals, and performs calculations of weight coefficients (as described below in detailed manner) based on the obtained three received signals. The respective received signals that have been subjected to the amplitude adjustments and the phase shifts are combined by a combiner 15. Subsequently, a demodulator 16 demodulates the combined received signal to output a demodulated signal. As a signal quality, a packet error rate or a throughput may be used in place of a bit error rate (BER). Further, each of the MIMO demodulator circuit 3 and the adaptive demodulator circuit 12 passes to the controller 5 the number of times of demodulation processes on data of the received signals (referred to as "the number of times of demodulation") in units of, e.g., a predetermined amount of data (such as, the number of bits, or the number of packets). The controller 5 performs a MIMO adaptive control process based on the information on the BER, the signal levels, and the number of times of demodulation, as described below with reference to FIGS. 13 and 14, and accordingly, changes the communication method used in the sender-side radio station apparatus and in the MIMO demodulator circuit 3.

Figure 12:
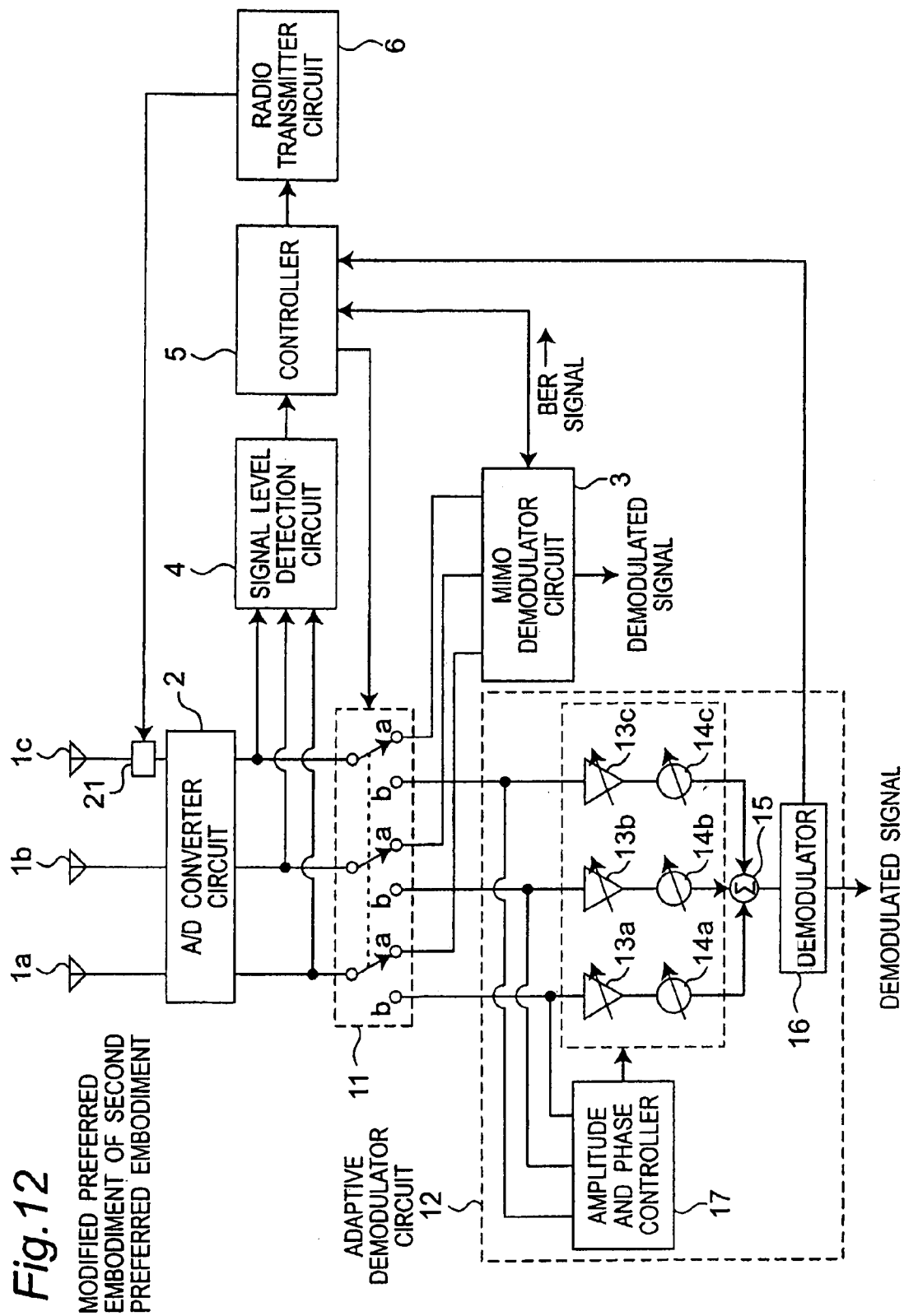
FIG. 12 is a block diagram showing a configuration of a MIMO antenna apparatus according to a modified preferred embodiment of the second preferred embodiment of the present invention.

FIG. 12 is a block diagram showing a configuration of a MIMO antenna apparatus according to a modified preferred embodiment of the present preferred embodiment. The MIMO antenna apparatus according to the modified preferred embodiment is characterized in that, a transmitting antenna 7 shown in FIG. 11 is integrated with one of the receiving antenna elements 1a, 1b and 1c for MIMO reception (in the example of FIG. 12, the transmitting antenna element is integrated with the antenna element 1c), in a similar manner to the modified preferred embodiment of the first preferred embodiment shown in FIG. 2. With the above-stated configuration, the MIMO antenna apparatus according to the modified preferred embodiment shown in FIG. 12 can reduce the number of antenna elements in the apparatus.

Generally speaking, in MIMO demodulation, a known signal (i.e., a reference signal) is stored in a receiver-side radio station apparatus in advance, a sender-side radio station apparatus transmits the same signal as this known signal to the receiver-side radio station apparatus, and the receiver-side radio station apparatus calculates a correlation between the known signal stored in advance and the received known signal, and accordingly, detects an amplitude and a phase of the received signal. In this case, for calculating the correlation, a complex conjugate of the known signal stored in the sender-side radio station apparatus in advance is multiplied by the received known signal. Further, if the known signal includes a plurality of bits, then correlations for the respective bits are calculated, and a sum or an average of the correlations can be used as a correlation value. Moreover, if different signal sequences (streams) are present, then the sender-side radio station apparatus transmits the same signal as the known signal to the receiver-side radio station apparatus at each of different times, and the receiver-side radio station apparatus estimates a propagation for each of the streams in order to achieve the MIMO demodulation. Nevertheless, if a strong interference wave signal(s) is present, the correlation can not be calculated at all. This is because the correlation between the known signal and the received signal is reduced, since the interference wave signals are added to the received signal.

Thus, if the interference wave signals are received, it would be impossible to perform a normal MIMO demodulation. Accordingly, it is needed to employ an interference suppression technique using an adaptive array antenna for controlling the received signal so that the received signal approaches the known signal. The adaptive array antenna works so as to improve the signal quality, and as a result, maximize the SINR. Particularly if the interference wave signals are not known, it is preferable to perform an adaptive control based on repetitive calculations. Since the adaptive demodulator circuit 12 is provided, the MIMO antenna apparatus according to the present preferred embodiment can perform the above-stated preferred process.

Figure 13:
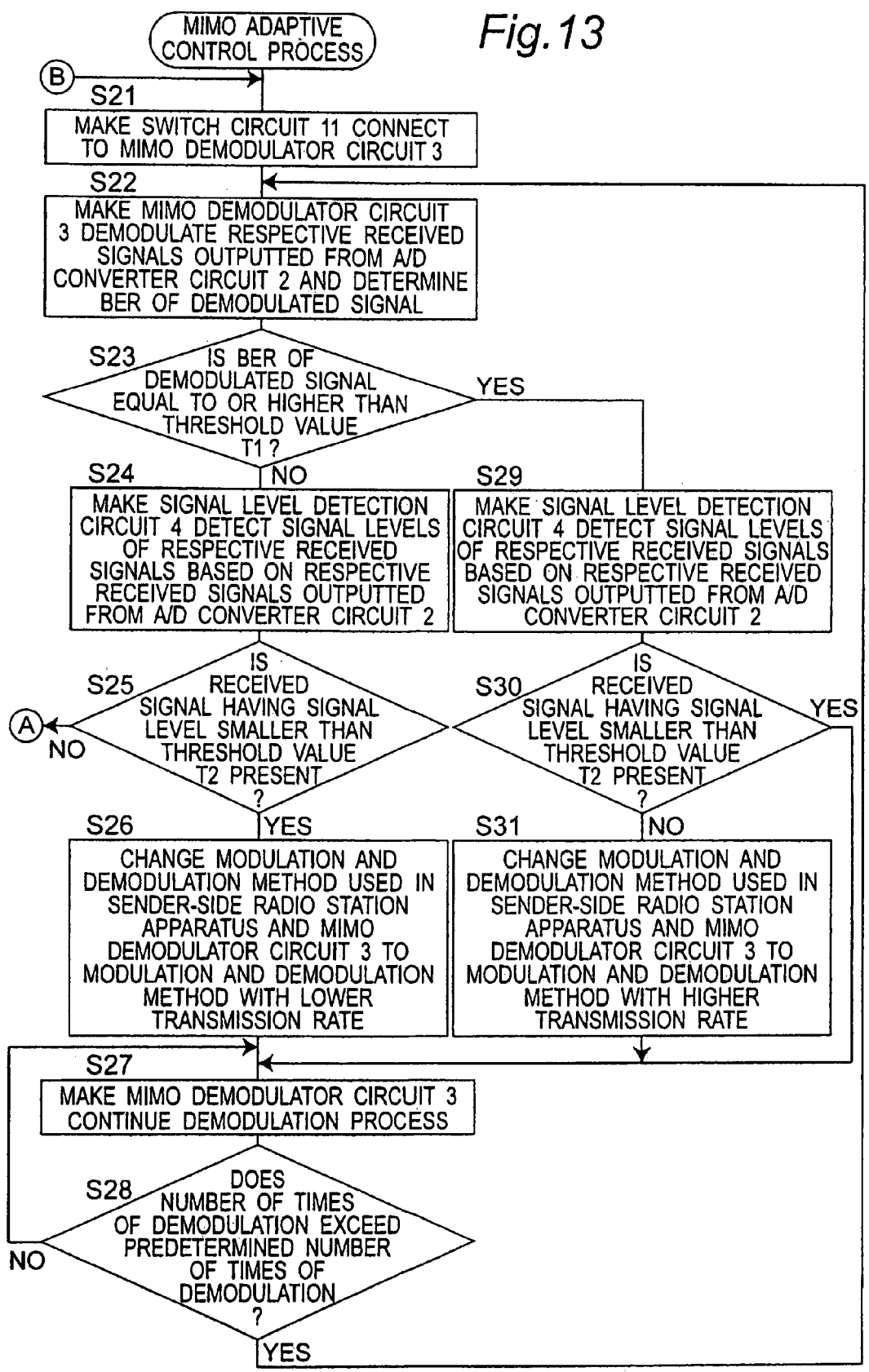
FIG. 13 is a flowchart showing a first part of a control flow of MIMO adaptive control process performed by the controller 5 shown in FIG. 11.
Figure 14:
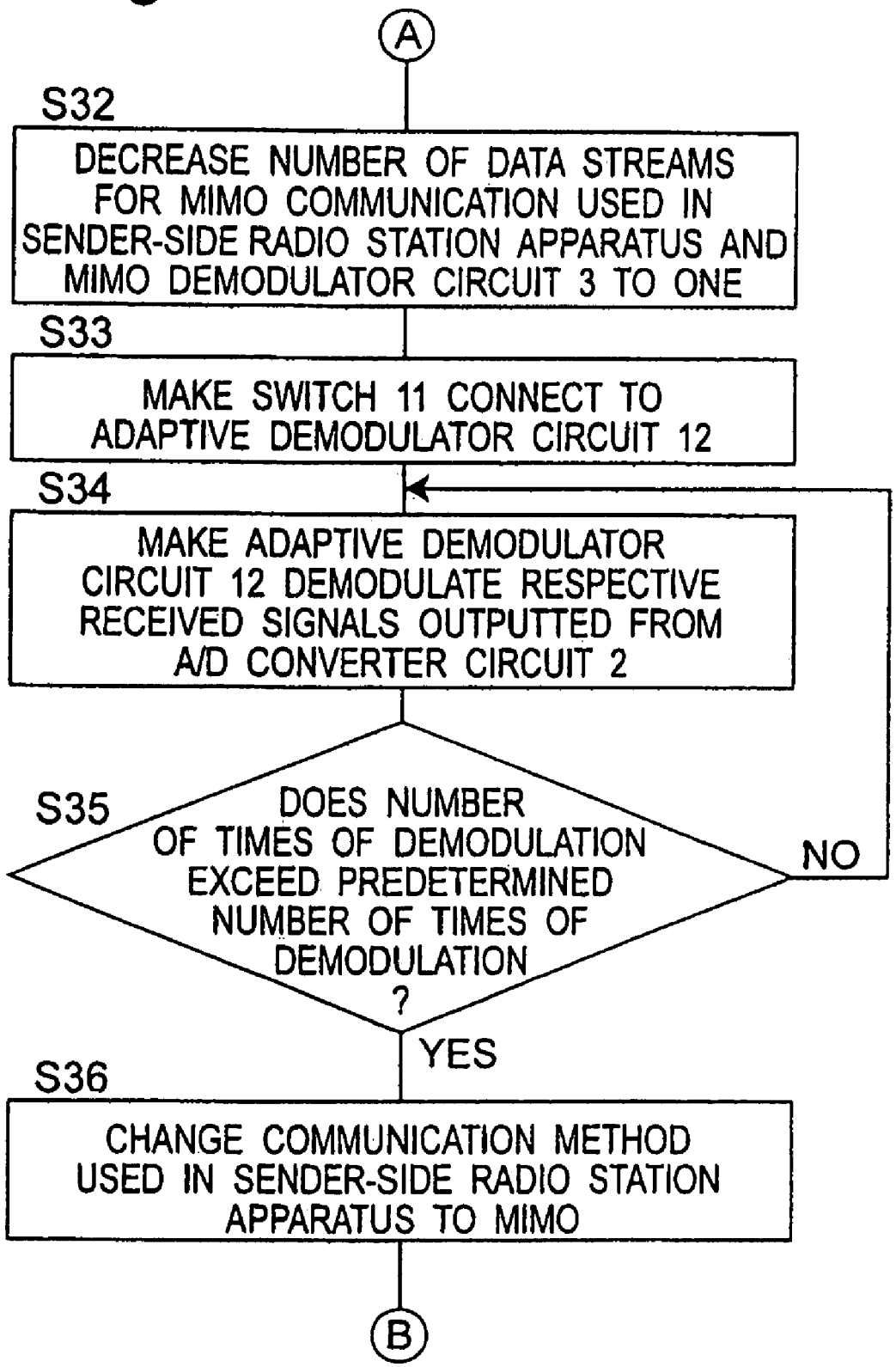
FIG. 14 is a flowchart showing a second part of the control flow of MIMO adaptive control process performed by the controller 5 shown in FIG. 11.

FIGS. 13 and 14 are flowcharts showing a control flow of MIMO adaptive control process performed by the controller 5 shown in FIG. 11. Referring to FIG. 13, in Step S21, the controller 5 initializes the switch circuit 11 to make the switch circuit 11 connect to the MIMO demodulator circuit 3. In Step S22, the controller 5 makes the MIMO demodulator circuit 3 demodulate respective received signals outputted from the A/D converter 2 circuit 2 to output a demodulated signal and determine the BER of the demodulated signal as the signal quality of the demodulated signal, and further, the controller 5 obtains the result of the determination from the MIMO demodulator circuit 3. In Step S23, the controller 5 determines whether or not the BER of the demodulated signal outputted from the MIMO demodulator circuit 3 is equal to or larger than a predetermined threshold value T1. If the BER of the demodulated signal is smaller than the threshold value T1, the control flow goes to Step S24. If the BER is equal to or larger than the threshold value T1, the control flow goes to Step S29. In this case, the threshold value T1 for the BER is set in the same manner as that of Step S2 of FIG. 7. In Step S24, the controller 5 makes the signal level detection circuit 4 detect the signal levels of respective received signals based on the respective received signals outputted from the A/D converter circuit 2, and further, the controller 5 obtains the results of the detection result from the signal level detection circuit 4. In Step S25, the controller 5 determines whether or not the received signal having a signal level smaller than a predetermined threshold value T2 is present. If the signal level of at least one received signal is smaller than the threshold value T2, the control flow goes to Step S26; otherwise, the control flow goes to Step S32 of FIG. 14. In this case, the threshold value T2 for the signal levels is set in the same manner as that of Step S4 of FIG. 7. In Step S26, in a manner similar to that of Step S6 of FIG. 7, the controller 5 changes the modulation and demodulation method used in the sender-side radio station apparatus and in the MIMO demodulator circuit 3 to a modulation and demodulation method with a lower transmission rate than a current transmission rate. In Step S27, the controller 5 makes the MIMO demodulator circuit 3 continue the demodulation process. In Step S28, in a manner similar to that of Step S13 of FIG. 7, the controller 5 determines whether or not the number of times of demodulation process performed by the MIMO demodulator circuit 3 exceeds a predetermined maximum number of times of demodulation. If the number of times of demodulation process performed by the MIMO demodulator circuit 3 exceeds the maximum number of times of demodulation, the control flow returns to Step S22; otherwise, the control flow returns to Step S27 at which the controller 5 makes the MIMO demodulator circuit 3 continue the demodulation process.

If the BER of the demodulated signal is equal to or larger than the threshold value T1 in Step S23, the control flow goes to Step S29 as stated above. Steps S29 to S31 are the same as Steps S7 to S9 of FIG. 7, respectively. In Step S29, the controller 5 makes the signal level detection circuit 4 detect the signal levels of the respective received signals based on the respective received signals outputted from the A/D converter circuit 2, and obtains the results of the detection from the signal level detection circuit 4. In Step S30, the controller 5 determines whether or not the received signal having the signal level smaller than the same threshold value T2 as that used in Step S25 is present. If the signal levels of all the received signals are equal to or larger than the threshold value T2, the control flow goes to Step S31; otherwise, the control flow goes to Step S27. In Step S31, in a manner similar to that of Step S9 of FIG. 7, the controller 5 changes the modulation and demodulation method used in the sender-side radio station apparatus and in the MIMO demodulator circuit 3 to a modulation and demodulation method with a higher transmission rate than the current transmission rate. After changing the modulation and demodulation method, the control flow goes to Step S27.

If the signal levels of all the received signals are equal to or larger than the threshold value T2 in Step S25, the control flow goes to Step S32 of FIG. 14 as stated above. In Step S32, the controller 5 changes the communication method so as to decrease the number of data streams for the MIMO communication used in the sender-side radio station apparatus and in the MIMO demodulator circuit 3 to one, and perform a SISO communication. In Step S33, the controller 5 makes the switch 11 connect to the adaptive demodulator circuit 12. In Step S34, the controller 5 makes the adaptive demodulator circuit 12 demodulate the respective received signals outputted from the A/D converter circuit 2. The adaptive demodulator circuit 12 weights and demodulates the respective received signals, such that a main beam of the MIMO antenna apparatus is directed to a desired wave signal, or such that a main beam of the MIMO antenna apparatus is directed to a desired wave signal and nulls of the MIMO antenna apparatus are directed to interference wave signals. The weighting (i.e., the calculations of weight coefficients) by the adaptive demodulator circuit 12 will be described below in detailed manner. Next, in Step S35, the controller 5 determines whether or not the number of times of demodulation process performed by the adaptive demodulator circuit 12 exceeds a predetermined maximum number of times of demodulation (e.g., the same number as the maximum number of times of demodulation in Step S28). If the number of times of demodulation exceeds the maximum number of times of demodulation, the control flow goes to Step S36 in order to monitor again the conditions of the desired wave signal and the interference wave signals for the MIMO communication; otherwise, the control flow returns to Step S34 at which the controller 5 makes the adaptive demodulator circuit 12 continue the demodulation process. In Step S36, the controller 5 changes the communication method used in the sender-side radio station apparatus to MIMO, and the control flow then returns to Step S21 of FIG. 13. In this case, the change of the communication method in Step S36 includes, for example, increasing the number of data streams for the communication method used in the sender-side radio station apparatus preferably to its maximum value (i.e., three).

As stated so far, according to the present preferred embodiment, it is possible to implement the MIMO antenna apparatus capable of performing process for the interference wave suppression, including the use of the adaptive demodulation, depending on the conditions of the desired wave signal and the interference wave signals. Particularly, if the desired wave signal is strong (i.e., Step S23 is YES), the controller 5 make the signal level detection circuit 4 detect the signal levels of the received signals in Step S29, and in this case, if the signal levels of the received signals are larger than the threshold value (i.e., the threshold value T2 of Step S25) for switching the demodulation method to the adaptive demodulation (i.e., Step S30 is YES), the sender-side radio station apparatus is instructed to change the modulation and demodulation method for the transmitted radio signals to the modulation and demodulation method with the higher transmission rate (e.g., by increasing the number of levels in the multi-level modulation and demodulation method) in Step S31. Accordingly, a high-speed and high signal quality communication can be achieved. Furthermore, a time period for re-monitoring the radio wave conditions can be determined by setting the maximum number of times of demodulation used in Steps S28 and S35, and accordingly, it is possible to implement the MIMO antenna apparatus capable of optimally dealing with a change in the propagation environment of the desired wave signal and the interference wave signals.

The demodulation process performed by the adaptive demodulator circuit 12 in Step S34 will be described below. In the present preferred embodiment, the amplitude and phase controller 17 performs the adaptive demodulation process by the repetitive calculations using only the received signals of the three receiving antenna elements 1a, 1b and 1c. Needless to say, this process can be changed depending on the number of receiving antenna elements.

The signals received through the respective receiving antenna elements 1a 1b and 1c are converted into digital signals by the A/D converter circuit 2, and inputted into the amplitude and phase controller 17 via the switch circuit 11. In the present preferred embodiment, these digital signals can be regarded as a vector including three elements. The amplitude and phase controller 17 determines the amplitude adjustment amounts of the amplitude adjusters 13a, 13b and 13c and the phase shift amounts of the phase shifters 14a, 14b and 14c, so as to optimize the signal quality (e.g., BER) of the signal obtained as a result of combining the respective amplitude-adjusted and phase-sifted received signals by the combiner 15 into the combined output signal and then demodulating the combined output signal by the demodulator 16. A method for calculating the amplitude adjustment amounts of the amplitude adjusters 13a, 13b and 13c and the phase shift amounts of the phase shifters 14a, 14b and 14c (hereinafter, referred to as "weight coefficients") will be described below.

A weight coefficient $w_i$ related to each of the receiving antenna elements 1a, 1b and 1c is defined by the following equation (21):

$$Wi = Ai^* \exp(j^* \phi i) \quad (21).$$

In the equation (21), symbol j denotes the imaginary unit, and a parameter i has values 1, 2 and 3, each of which corresponds to the signal received through each one of the receiving antenna elements 1a, 1b and 1c. Further, symbol Ai denotes an amplitude adjustment amount and symbol $\phi i$ denotes a phase shift amount. In the following description, For simplicity, a method for calculating a weight coefficient w(t) for one received signal s(t) received through one of the receiving antenna elements 1a, 1b and 1c will be described.

Several methods for calculating the weight coefficient are known. In the present preferred embodiment, take for instance a method using the steepest gradient (least means squares: LMS). With this method, the receiver-side radio station apparatus, in which the adaptive demodulation process is performed, stores a known signal sequences (or a reference signal) r(t) in advance, the sender-side radio station apparatus transmits a desired wave signal including the known reference signal r(t) to the receiver-side radio station apparatus, and then the receiver-side radio station apparatus controls the amplitude adjustment amount and the phase shift amount for the received desired wave signal so that the received desired wave signal approaches the stored reference signal. In the present preferred embodiment, the reference signal r(t) is assumed to be stored in the amplitude and phase controller 17. Specifically, the amplitude and phase controller 17 controls one of the amplitude adjusters 13a, 13b and 13c and one of the phase shifters 14a, 14b and 14c, so as to multiply a digital signal s(t), which is received through one of the antenna elements 1a, 1b and 1c, converted by A/D converter circuit 2 and inputted into the adaptive demodulator circuit 12, by a weight coefficient w(t) including an amplitude component and a phase component. Then, a residual error e(t) is calculated between the signal obtained by multiplying the digital signal s(t) by the weight coefficient w(t), and the reference signal r(t). The residual error e(t) is obtained as expressed by the following equation (22):

$$e(t)=r(t)-w(t)*s(t) \qquad (22).$$

The residual error e(t) has either a positive or negative value. Therefore, a minimum value of a square of the residual error e(t) obtained by the equation (22) is recurrently calculated (i.e., the repetitive calculations are performed). Accordingly, a weight coefficient w(t, m+1) of an (m+1)-th repetition is obtained as expressed by the following equation (23) using an m-th weight coefficient w(t, m):

$$w(t,m+1)=w(t,m)+u*s(t)*e(t,m) \qquad (23).$$

In the equation (23), symbol u is referred to as "step size". If the step size u is large, the number of repetitive calculations, by which the weight coefficient converges so as to yield the minimum value, can be advantageously reduced. However, if the step size u is too large, the weight coefficient disadvantageously oscillates near the minimum value. Therefore, it is necessary to take due care of selecting the step size depending on the system to be used. Conversely, if the step size u is set small, although the weight coefficient can stably converge so as to yield the minimum value, the number of repetitive calculations increases. The more the number of repetitive calculations increases, the longer the time for calculating the weight coefficient is required. Providing that the time for calculating the weight coefficient is longer than the time during which the surrounding environment varies (e.g., several milliseconds), it is impossible to improve the signal quality using the weight coefficient. Thus, when determining the step size u, it is necessary to select the conditions for convergence as rapid and stable as possible. Furthermore, the residual error e(t, m) in the equation (23) is defined by the following equation (24):

$$e(t,m)=r(t)-w(t,m)*s(t) \qquad (24).$$

The equation (23) is recurrently updated using the value expressed by the equation (24). It is to be noted that the maximum number of repetitive calculations for calculating the weight coefficient is set so that the for calculating the weight coefficient is not longer than the time for switching the radio system.

In the present preferred embodiment, the weight coefficient calculation method based on the steepest gradient method has been described by way of example, however, the present invention is not limited to such method. For example, RLS (Recursive Least-Squares) method or SMI (Sample Matrix Inversion) method can be used, in which the weight coefficient can be determined faster. If one of these alternative methods is used, then calculation time is shorten, but the calculation by the amplitude and phase controller 17 is more complicated.

Moreover, if the modulation method of signal sequences is a constant envelope modulation having a constant envelope such as digital phase modulation, CMA (Constant Modulus Algorithm) can also be used.

As stated so far, according to the present preferred embodiment of the present invention, it is possible to implement the MIMO antenna apparatus capable of performing the adaptive demodulation process, which, when the signal quality of the demodulated signal is equal to or smaller than the threshold value T1, obtains the received signal levels in relation to the respective antenna elements constituting the MIMO antenna apparatus, and performs an MIMO communication optimum for the radio environment including the desired wave signal and the interference wave signals based on the obtained received signal levels.

According to the present invention, the MIMO antenna apparatus decreases the number of data streams for the MIMO communication method, and/or changes the modulation and demodulation method for the MIMO communication method, based on the signal quality of the demodulated signal and the signal levels of the respective received signals. Therefore, according to the present preferred embodiment, the MIMO antenna apparatus can be provided which, even if it is small in size, can perform a high quality and high-speed communication by performing both the interference wave suppression and the MIMO demodulation process in the case that the desired receiving quality is not achieved. Additionally, according to the present preferred embodiment, the mobile radio communication apparatus with such MIMO antenna apparatus can be provided.

As another modified preferred embodiment of the second preferred embodiment, it is possible to configure a MIMO antenna apparatus so as to employ a MIMO communication with two data streams for a radio communication, in the case that one interference wave signal appears while performing the MIMO communication with three data streams. In such MIMO antenna apparatus, the MIMO demodulation can be achieved by performing the repetitive adaptive control for each data stream.

As stated so far, according to the present preferred embodiments, the MIMO antenna apparatus can be provided which, even if it is small in size, can perform a high quality and high-speed communication by adaptively controlling the number of data streams and the modulation and demodulation method for the MIMO communication method, or alternatively, by performing both the interference wave suppression and the MIMO demodulation process, in the case that the desired receiving quality is not achieved. Additionally, according to the present preferred embodiments, the mobile radio communication apparatus with such MIMO antenna apparatus can be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A MIMO antenna apparatus that receives a plurality of radio signals modulated and transmitted by a sender-side radio station apparatus using a MIMO (Multi-Input Multi-Output) communication method with a number of data streams and a modulation and demodulation method, the MIMO antenna apparatus comprising:

a plurality of antenna elements for receiving the plurality of radio signals, respectively;

a detector for detecting respective received signal levels of the plurality of radio signals;

a MIMO demodulator for performing MIMO demodulation of the plurality of radio signals to generate a first demodulated signal, and for determining a signal quality of the first demodulated signal;

a radio transmitter for wirelessly transmitting a control signal to the sender-side radio station apparatus, the control signal controlling the MIMO communication method used by the sender-side radio station apparatus; and a controller for controlling the sender-side radio station apparatus by making the radio transmitter transmit the control signal, and controlling the MIMO demodulator, so as to change, based on the received signal levels and the signal quality, at least one of the number of data streams and the modulation and demodulation method for the MIMO communication method used by the sender-side radio station apparatus and the MIMO demodulator, wherein in the case that the signal quality of the first demodulated signal is lower than a first threshold value, (1) when the received signal levels of all of the plurality of radio signals are equal to or larger than a second threshold value, the controller decreases the number of data streams for the MIMO communication method used by the sender-side radio station apparatus and the MIMO demodulator; and (2) when the received signal level of at least one of the plurality of radio signals is smaller than the second threshold value, the controller changes the modulation and demodulation method for the MIMO communication method used by the sender-side radio station apparatus and the MIMO demodulator to a modulation and demodulation method with a transmission rate lower than a current transmission rate.

2. The MIMO antenna apparatus as claimed in claim 1, wherein in the case that the signal quality of the first demodulated signal is equal to or larger than the first threshold value, when the received signal levels of all of the plurality of radio signals are equal to or larger than the second threshold value, the controller changes the modulation and demodulation method for the MIMO communication method used by the sender-side radio station apparatus and the MIMO demodulator to a modulation and demodulation method with a transmission rate higher than the current transmission rate.

3. The MIMO antenna apparatus as claimed in claim 1, wherein in the case that the controller has decreased the number of data streams for the MIMO communication method used by the sender-side radio station apparatus and the MIMO demodulator to a certain number, when number of times of demodulation performed by the MIMO demodulator exceeds a certain maximum number of times of demodulation, the controller increases the number of data streams for the MIMO communication method used by the sender-side radio station apparatus and the MIMO demodulator.

4. The MIMO antenna apparatus as claimed in claim 1, further comprising:

an adaptive demodulator for generating a second demodulated signal when the number of data streams is one, by weighting and demodulating the plurality of radio signals such that a main beam of the MIMO antenna apparatus is directed to a desired wave signal; and a switch operable to input the plurality of radio signals into one of the MIMO demodulator and the adaptive demodulator, wherein in the case that the controller have controlled the switch to make the switch input the plurality of radio signals into the MIMO demodulator and the signal quality of the first demodulated signal is smaller than the first threshold value, (1) when the received signal levels of all of the plurality of radio signals are equal to or larger than the second threshold value, the controller decreases the number of data streams for the MIMO communication method used by the sender-side radio station apparatus and the MIMO demodulator to one, and controls the switch to make the switch input the plurality of radio signals into the adaptive demodulator; and (2) when the received signal level of at least one of the plurality of radio signals is smaller than the second threshold value, the controller changes the modulation and demodulation method for the MIMO communication method used by the sender-side radio station apparatus and the MIMO demodulator to a modulation and demodulation method with a transmission rate lower than a current transmission rate.

5. The MIMO antenna apparatus as claimed in claim 4, wherein the adaptive demodulator weight the plurality of radio signals by performing recurrent and repetitive processes such that the main beam of the MIMO antenna apparatus is directed to a desired wave signal.

6. The MIMO antenna apparatus as claimed in claim 4, wherein in the case that the controller have controlled the switch to make the switch input the plurality of radio signals into the MIMO demodulator and the signal quality of the first demodulated signal is equal to or larger than the first threshold value, when the received signal levels of all of the plurality of radio signals are equal to or larger than the second threshold value, the controller changes the modulation and demodulation method for the MIMO communication method used by the sender-side radio station apparatus and the MIMO demodulator to a modulation and demodulation method with a transmission rate higher than the current transmission rate.

7. The MIMO antenna apparatus as claimed in claim 4, wherein in the case that the controller have controlled the switch to make the switch input the plurality of radio signals into the adaptive demodulator, when number of times of demodulation performed by the adaptive demodulator exceeds a maximum number of times of demodulation, the controller controls the switch to make the switch input the plurality of radio signals into the MIMO demodulator, and increases the number of data streams for the MIMO communication method used by the sender-side radio station apparatus and the MIMO demodulator.

8. The MIMO antenna apparatus as claimed in claim 1, wherein the radio transmitter transmits the control signal to the sender-side radio station apparatus using at least one of the plurality of antenna elements.

9. A radio communication apparatus provided with a MIMO antenna apparatus that receives a plurality of radio signals modulated and transmitted by a sender-side radio station apparatus using a MIMO (Multi-Input Multi-Output) communication method with a number of data streams and a modulation and demodulation method, the MIMO antenna apparatus comprising:

a plurality of antenna elements for receiving the plurality of radio signals, respectively;

a detector for detecting respective received signal levels of the plurality of radio signals;

a MIMO demodulator for performing MIMO demodulation of the plurality of radio signals to generate a first demodulated signal, and for determining a signal quality of the first demodulated signal;

a radio transmitter for wirelessly transmitting a control signal to the sender-side radio station apparatus, the control signal controlling the MIMO communication method used by the sender-side radio station apparatus; and a controller for controlling the sender-side radio station apparatus by making the radio transmitter transmit the control signal, and controlling the MIMO demodulator, so as to change, based on the received signal levels and the signal quality, at least one of the number of data streams and the modulation and demodulation method for the MIMO communication method used by the sender-side radio station apparatus and the MIMO demodulator, wherein in the case that the signal quality of the first demodulated signal is lower than a first threshold value, (1) when the received signal levels of all of the plurality of radio signals are equal to or larger than a second threshold value, the controller decreases the number of data streams for the MIMO communication method used by the sender-side radio station apparatus and the MIMO demodulator; and (2) when the received signal level of at least one of the plurality of radio signals is smaller than the second threshold value, the controller changes the modulation and demodulation method for the MIMO communication method used by the sender-side radio station apparatus and the MIMO demodulator to a modulation and demodulation method with a transmission rate lower than a current transmission rate.

* * * * *